United States Patent
Idema

(10) Patent No.: US 12,524,494 B2
(45) Date of Patent: Jan. 13, 2026

(54) METHODS AND SYSTEMS FOR OBTAINING AND STORING WEB PAGES

(71) Applicant: Xero Limited, Wellington (NZ)

(72) Inventor: Maarten Idema, Wellington (NZ)

(73) Assignee: Xero Limited, Wellington (NZ)

( * ) Notice: Subject to any disclaimer, the term of this patent is extended or adjusted under 35 U.S.C. 154(b) by 16 days.

(21) Appl. No.: 18/028,385

(22) PCT Filed: Apr. 20, 2022

(86) PCT No.: PCT/NZ2022/050045
§ 371 (c)(1),
(2) Date: Mar. 24, 2023

(87) PCT Pub. No.: WO2022/235170
PCT Pub. Date: Nov. 10, 2022

(65) Prior Publication Data
US 2024/0054174 A1    Feb. 15, 2024

(30) Foreign Application Priority Data

May 5, 2021 (AU) .................................. 2021901343

(51) Int. Cl.
*G06F 16/958* (2019.01)
*G06F 11/30* (2006.01)
*G06F 11/34* (2006.01)
*G06F 16/957* (2019.01)

(52) U.S. Cl.
CPC .......... *G06F 16/986* (2019.01); *G06F 11/302* (2013.01); *G06F 11/3409* (2013.01); *G06F 16/957* (2019.01)

(58) Field of Classification Search
CPC .. G06F 16/986; G06F 11/302; G06F 11/3409; G06F 16/957
USPC ........................................................ 715/234
See application file for complete search history.

(56) References Cited

U.S. PATENT DOCUMENTS 9,645,910 B1    5/2017 Kaila et al.
9,678,928 B1    6/2017 Tung
10,839,039 B1 *  11/2020 Wiley ................. G06F 16/9577
(Continued)

*Primary Examiner* — Stephen S Hong
*Assistant Examiner* — Broderick C Anderson
(74) *Attorney, Agent, or Firm* — Young Basile Hanlon & MacFarlane, P.C.

(57) ABSTRACT

A computing apparatus executes an application configured to perform a process for one or more web browser applications, each configured receive an input URL and acquire code from a web server location identified by the input URL, and generate a client-side representation of the acquired code, the process comprising: causing the web browser application to execute with a target URL as the input URL; obtaining, as a first client-side representation, a client-side representation of the acquired code as generated by the web browser application; obtaining, as a second client-side representation, a second client-side representation of code acquired from the target URL; calculating a difference metric; comparing the difference metric with a threshold, and based on the comparison: causing an analytics script to run on the target URL to obtain a set of performance indicators; and causing the first client-side representation to be stored in association with the performance indicators.

11 Claims, 20 Drawing Sheets

(56) References Cited

U.S. PATENT DOCUMENTS

| | | | |
|---|---|---|---|
| 2012/0017278 A1* | 1/2012 | Fisher | H04L 63/1416 |
| | | | 726/22 |
| 2012/0218284 A1* | 8/2012 | Yager | G09G 5/003 |
| | | | 345/589 |
| 2012/0310893 A1 | 12/2012 | Wolf et al. | |
| 2013/0263098 A1* | 10/2013 | Duda | G06F 11/3664 |
| | | | 717/134 |
| 2015/0248225 A1* | 9/2015 | Goyal | G06F 16/9577 |
| | | | 715/747 |
| 2015/0339268 A1 | 11/2015 | Bednarz, Jr. et al. | |
| 2018/0191764 A1* | 7/2018 | Chawla | G06F 16/951 |
| 2020/0175088 A1* | 6/2020 | Pham | G06F 16/957 |
| 2021/0334455 A1* | 10/2021 | Gkoulalas-Divanis | G06F 40/216 |

* cited by examiner

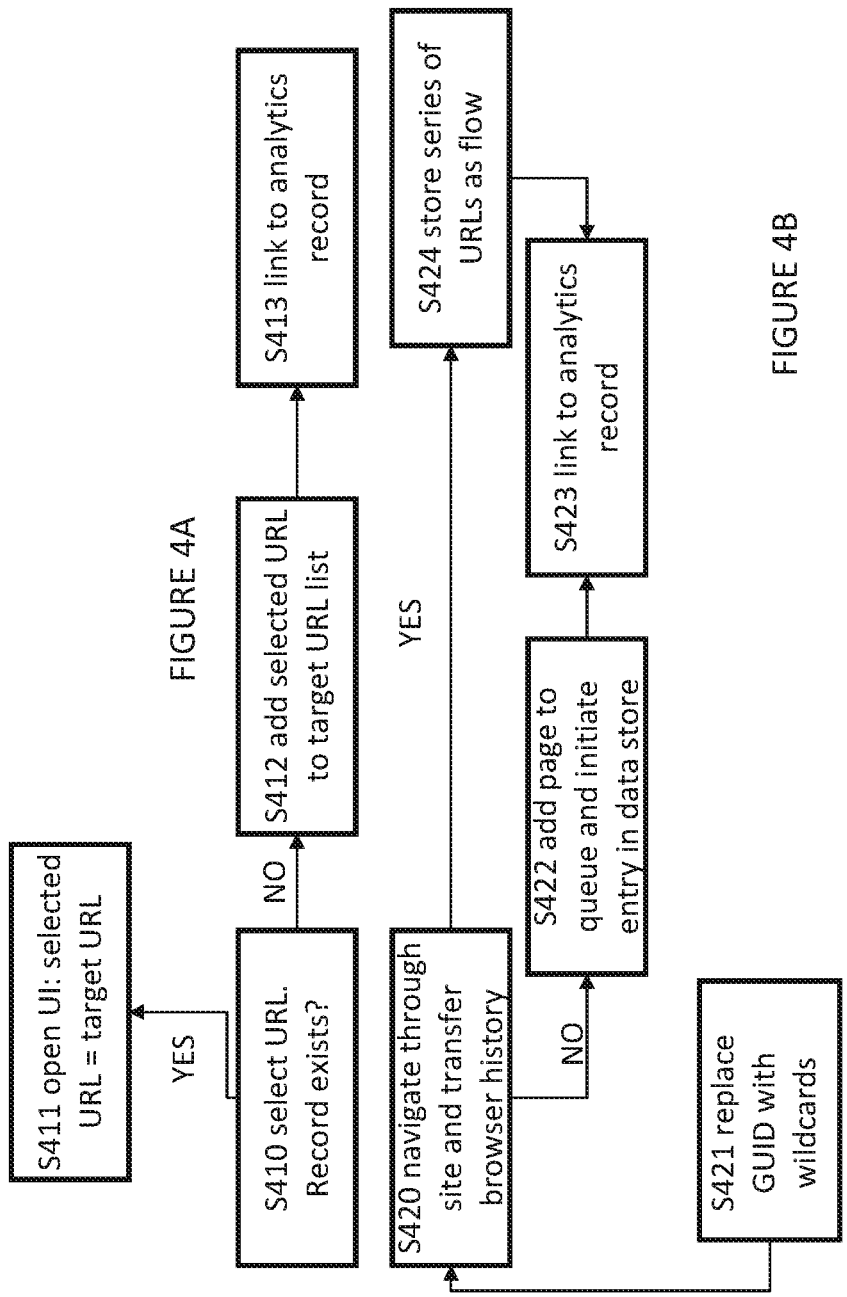

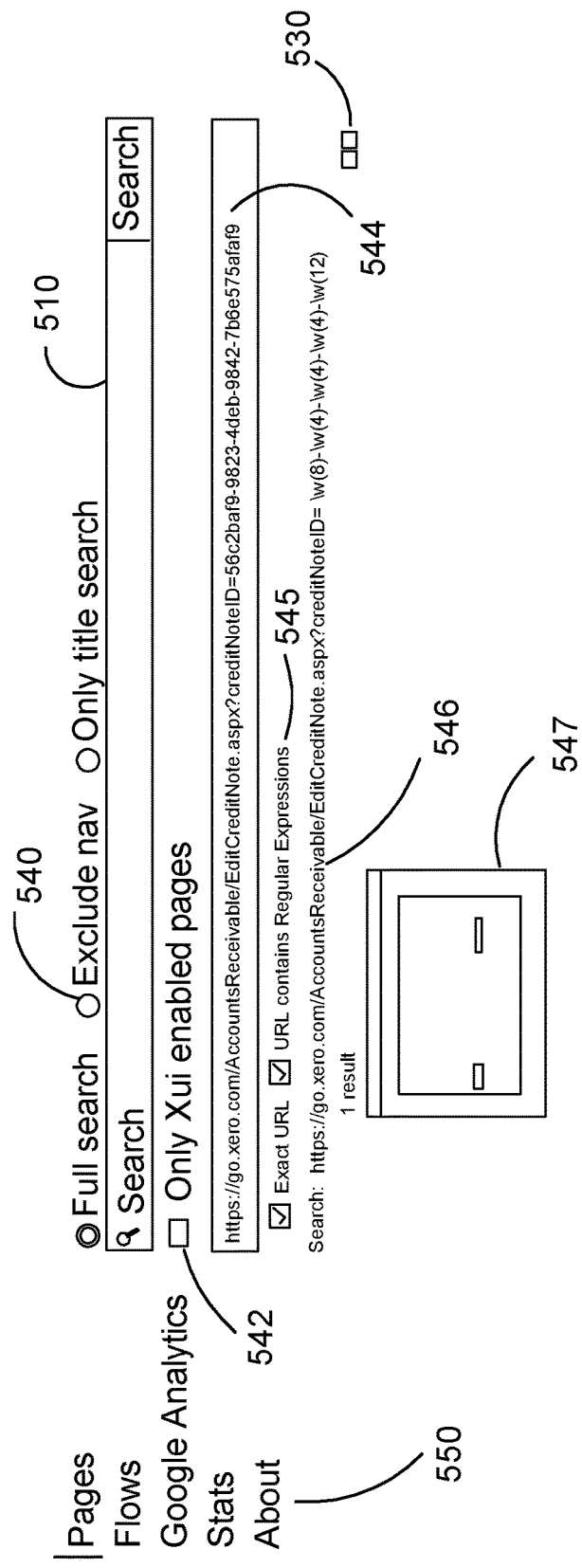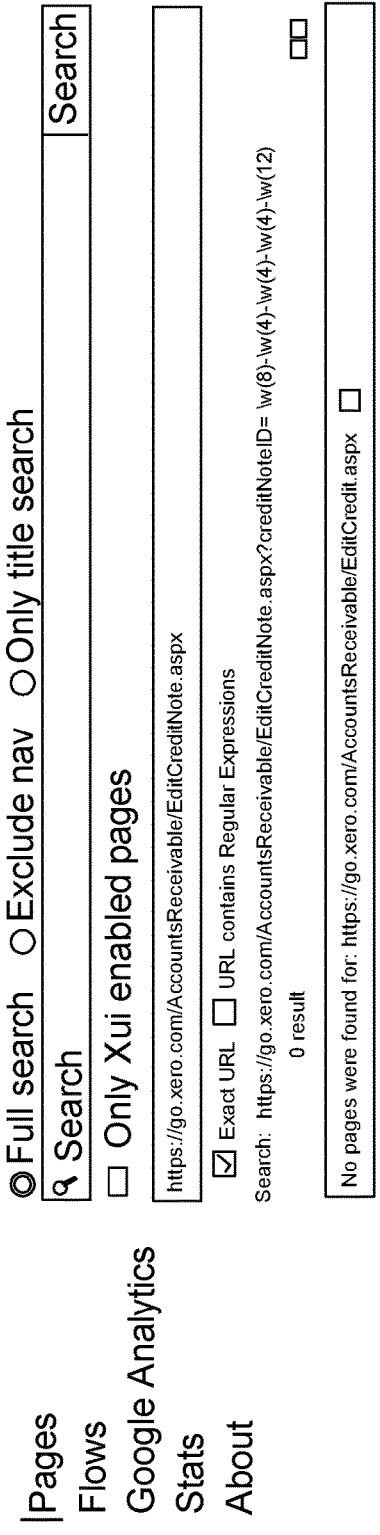
FIGURE 5C
FIGURE 5D

← Go back to last organisation

Demo Company (NZ) | Dashboard  Business  Accounting  Payroll  Projects  Contacts    +  △  ○  ○

New invoice [Draft]    Preview      Preview [Send] ▶

Add more details for polished, professional invoices.    Skip for now  [Add details] ✕

| To | Reference | Invoice number | Issue date | Due date |
|---|---|---|---|---|
| ♀ Who is it for ? | ■ Optional | # | 📅 6 Nov 2019 ▶ | 📅 6 Nov 2019 ▶ |

Currency                                Branding theme
₲ New Zealand D... ▶           ↻ Standard ▶

Item                 Quantity    Price    Amount

Add an item...

Subtotal incl tax ▶    0.00

Total GST    0.00

Attach files ▶        Total    0.00

Switch to classic invoicing

← Go back to last organisation

Demo Company (NZ)   Dashboard  Business  Accounting  Payroll  Projects  Contacts   +  ◇  ○

New invoice  Draft

Add more details for polished, professional invoices.   Skip for now   Add details  ✕

To                    Reference    Invoice number   Issue date       Due date
♀ Who is it for?     ■ Optional   #                🗓 8 Nov 2019 ▶  🗓 8 Nov 2019 ▶

Currency                          Branding theme
Online payments                   ⊕ New Zealand D... ▶              ⟲ Standard ▶
Manage online payments Item / description...            Quantity    Price    Amount
Add an item / description...

Subtotal incl tax ▶           0.00
                                 Total GST                     0.00

Total                         0.00

Attach files ▶

Switch to classic invoicing

FIGURE 7C

Edit pages

URL (required)
developer.xero.com/myapps/details/ #1202

Title overide
Xero Developer | My Apps details

Sometimes the title doesn't make sense out of context or the title is the same across several different pages. Filename it here.

Country edition
Australia
Global
New Zealand
United Kingdom

Hold down Command on a Mac or Control on a PC to select more than one country.

Same as page
▼

Associated Google Analytics
developer.xero.com/myapps/details/ #1202 ▼

Notes

912

910

914 — Save

FIGURE 9B

Add pages

URL (required) — 902

Country edition — 904
Australia
Global
New Zealand
United Kingdom

Hold down Command on a Mac or Control on a PC to select more than one country.

Same as page — 906
▼

Associated Google Analytics — 908
▼

Notes

909

900

Save

FIGURE 9A

METHODS AND SYSTEMS FOR OBTAINING AND STORING WEB PAGES

CROSS-REFERENCE TO RELATED APPLICATION(S)

This application is a 371 national phase application of International Application Serial No. PCT/NZ2022/050045, filed Apr. 20, 2022, which claims priority to and the benefit of Australian Patent Application Serial No. 2021901343, filed May 5, 2021, the entire disclosures of which are hereby incorporated by reference.

TECHNICAL FIELD

Embodiments generally relate to methods, systems, and computer-readable media for web page rendering and rendered web page performance analysis. Some embodiments relate to web page rendering and obtaining performance indicators for rendered web pages.

BACKGROUND

Website code is typically stored in a server side representation of the code before it is interpreted by a client side web browser application. Therefore, for a very large and complex site, it can be challenging to understand the performance of individual web pages, where particular components are used, how users utilise the site, and the like.

Performance of websites according to performance indicators such as weight, load time, and accessibility, is an important consideration for designers, developers, and engineers wishing to improve user experience and reduce load on host servers.

Historical changes in performance of the website, and individual pages therein, may be linked to changes in appearance of the website that are difficult or impossible to appreciate based solely on the server-side website code.

Existing archiving systems for designers, developers, and engineers, store past versions of server-side website code. Separate performance analysis tools obtain performance indicators.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

Embodiments include a computing apparatus, configured to: execute an application, the application being configured, when executed, to perform a process for one or more web browser applications, each web browser application being configured, when executed, to receive an input URL and to acquire code from a web server location identified by the input URL, and to generate a client-side representation of the acquired code; the process comprising: causing the web browser application to execute with a target URL as the input URL; obtaining, as a first client-side representation, a client-side representation of the acquired code as generated by the web browser application; obtaining, as a second client-side representation, a second client-side representation of code acquired from the target URL; calculating a difference metric indicative of a difference between the first client-side representation and the second client-side representation; comparing the difference metric with a threshold, and based on a result of the comparison: causing an analytics script to run on the target URL to obtain a set of one more performance indicators; and causing the first client-side representation to be stored in association with the one or more performance indicators.

Some embodiments address the technical problem of identifying and tracking changes to how a webpage appears at a client side in rendered form.

Generating a client side representation of the code may be interpreting code by the browser to generate a DOM and/or CSSOM as the client-side representation. The generating may further comprise rendering the DOM and/or CSSOM to generate a rendered webpage as the client-side representation. The code that is interpreted by the browser may be the code as acquired from the server side and may also include static assets such as javascript, CSS, and/or images. The code may also include the results of API requests. That is, the web browser application acquires code from the server side and optionally also acquires code from static assets (detailed above) and/or API request results. In some examples, the code as acquired from the server may also be modified in accordance with an interpretation of the javascript, the results of the API requests, or the like. The client-side representation is at least one of: a document object model, a CSS object model and/or a render tree (which may include or may be generated using a document object model and/or a CSS object model) generated by interpreting the acquired code; and a rendered webpage generated by rendering the render tree.

Embodiments provide a computationally efficient mechanism for tracking performance indicators over time by restricting running of analytics scripts to cases in which a client-side representation of a webpage (i.e. a rendered form of the website) has changed by more than a threshold amount (wherein the threshold may be any suitable amount, and in some examples may be 0 or 1%) relative to a reference client-side representation of the webpage. For example, the reference client-side representation may be a most recent client-side representation of the webpage stored in a data store.

Embodiments provide a mechanism for recording changes in a web page over time, in a manner that is efficient in terms of storage space usage by virtue of adding a new entry to a stored time series only when an amount of change since the latest recorded entry meets a threshold. Change in the context of embodiments is in the rendered version of the web page at the client-side, and so embodiments provide a mechanism for tracking changes in a client-side representation of a web page over time.

Optionally, the process is performed on a repetitive basis for each web browser application, the second client-side representation is a most recent member of a time series of client-side representations of code acquired from the target URL, the first client-side representation is caused to be stored in the time series as a new most recent member.

Time series is taken to mean one or more versions of the representation acquired at different points in time so that they can be arranged chronologically. For example, each representation may be time stamped, so that an order is defined by the time stamps and the representations are stored and can be accessed according to the defined order. Metadata stored with the time series for a target URL includes the target URL itself as a string or other text format.

The client-side representations may be renderings of the acquired code, wherein a rendering of the acquired code is an image of the web browser application, such as a user interface image. The client-side representations may be constructed and/or interpreted code artefacts such as a document object model, DOM, a CSS object model, CSSOM, and/or a render tree. A web browser application renders the constructed code artefact(s) to obtain the rendering that is displayed to a user (i.e. on a display unit).

Optionally, the one or more web browser applications comprises: a first web browser application configured to identify as a desktop or laptop web browser when acquiring the code from the web server location identified by the input URL; and a second web browser application configured to identify as a mobile device web browser application when acquiring the code from the web server location identified by the input URL, and to emulate a mobile device web browser when generating the client-side representation. For example, the first web browser application configured to identify as a desktop or laptop web browser when acquiring the code from the web server location identified by the input URL may comprise the first web browser application being configured to mimic a window size of a screen typical of a desktop or laptop. Similarly, the second web browser application being configured to identify as a mobile device web browser application when acquiring the code from the web server location identified by the input URL may comprise the second web browser application being configured to mimic a window size of a screen typical of a mobile device.

Advantageously, the use of plural web browser applications enables a user of the application to track client-side representations as they appear on multiple device types. A mobile device may be, for example, a mobile phone (i.e. a smartphone) device, or a tablet. Alternatively, a third web browser application may be configured to identify as a tablet device web browser application when acquiring the code from the web server location identified by the input URL, and to emulate a tablet device web browser when rendering the acquired code.

Optionally, the set of one or more performance indicators includes an accessibility metric, being a metric representing accessibility for cognitive-impaired users, neurological-impaired users, physical-impaired users, speech-impaired users, hearing-impaired users and/or visually-impaired users of a web page as displayed by the respective web browser application by interpreting and rendering the acquired code. Alternatively, the metric representing accessibility for cognitive-impaired users, neurological-impaired users, physical-impaired users, speech-impaired users, hearing-impaired users and/or visually-impaired users is obtained by a remote web browser engine configured to interpret and render code acquired from the target URL and to calculate the metric representing accessibility and provide the calculated metric to the application upon request by the application.

Accessibility metrics return little or no meaningful performance indication from web server side code alone. Advantageously, such embodiments enable the storage of client-side representations of a web page in association with accessibility metrics based on those client-side representations. An accessibility metric and the representation of the web page giving rise to the metric (i.e. the particular score or value of the metric) are stored in association with one another for reference by an accessibility developer or engineer.

Optionally, the representations of the acquired code obtained as the first and second client-side representations, are snapshot images of a webpage as displayed by the respective web browser application by interpreting and rendering the acquired code.

Advantageously snapshot images provide an accurate record of the web page as viewed at the client-side. Snapshot images may be in the form of bitmaps, jpegs, PNG file, or some other image format. Snapshot images may be obtained and stored in one or multiple image formats.

Code acquired from the server side at a location determined by the target URL is interpreted by the web browser application (i.e. by the browser engine) to generate a render tree (which may be, for example, generated using a document object model from HTML and a CSS object model from CSS). The render tree is rendered by the web browser application (i.e. by the browser engine) to generate the web page (which may be, for example, a user interface) as displayed in the browser window on a display unit. That is, the interpreting is the generation of a document object model, DOM, and/or a CSS object model, CSSOM, from the code acquired from the target URL (i.e. from the server side at a location determined by the target URL) and optionally other server side locations (e.g. for example, as a result of API requests, receiving static assets, etc). In some examples, the acquired code, DOM, CSSOM, or the like may be modified in accordance with the results of interpreting code acquired from server side locations (for instance, as a result of interpreting javascript, or the like). In other words, the rendering is the generation of a webpage (which may be a user interface) from the result of the interpreting (i.e. a render tree which is generated using the DOM and/or CSSOM).

Optionally, the difference metric is calculated by an image differentiating algorithm.

Advantageously, image differentiating algorithms (which may be referred to as image differencing algorithms) provide a mechanism to quantify differences between two images and to identify the locations of the differences. Embodiments obtaining and storing snapshot images as client-side representations can leverage image differentiating algorithms to quantify and identify differences.

In a particular example of image differentiating algorithms, an algorithm may quantify and identify differences based on a pixel-wise comparison of pixel values at equivalent locations (embodiments may be restricted to predefined image dimensions and image format for the snapshot images in terms of horizontal pixels×vertical pixels). Embodiments may include a pre-processing stage to normalize certain attributes across the two images to be compared.

Optionally, the first client side representation is stored in association with a difference image based on pixel-wise-subtracting the first client-side representation from the second client-side representation, or vice-versa.

Optionally the representations of the rendered acquired code obtained as the first and second client-side representations, are text representations of the respective acquired code as interpreted by the respective web browser application.

Advantageously, such embodiments provide a mechanism for the storage of representations of a rendered version of web code to be obtained and stored. Examples of text representations include document object models, CSS object models, and render trees. The text representations are constructed by the web browser application from code acquired from the target URL. Text representations are quick to compare and enable a developer to identify changes in one or more interpreted code artefacts. The text representation may be one or a combination of DOM, CSSOM, and render tree. A render tree may be generated using a DOM and/or CSSOM, depending on the acquired code.

Optionally, the first and second client-side representations, are multi-modal representations comprising a text representation respective acquired code as interpreted by the respective web browser application and a snapshot image of a webpage as displayed by the respective web browser application by interpreting and rendering the acquired code; and the difference metric comprises a contribution from each of an image differentiating algorithm comparing the snapshot images and a text differentiating algorithm comparing the text representations.

Advantageously, multi-modal representations provide a mechanism for image and text client-side representations of a web page to be obtained, compared and stored. Multi-modal representations enable a developer to see at-a-glance how changes in a text representation of interpreted code manifest in a snapshot image of the rendered web page.

Optionally, the application is configured to repeat the process periodically according to a predefined period, and to provide an alert to a registered alert recipient in the event of the difference metric exceeding the threshold, the alert indicating at least the target URL.

The predefined period is selectable by an operator of the application and may be changed even once one or more repetitions are performed, so predefined is taken to mean defined ahead of the next period, rather than meaning defined ahead of all periods. The registered alert enables an alert recipient to verify that changes to web pages at the client side are in accordance with intended changes.

Optionally, the process further comprises, following the obtaining and preceding the calculating the difference metric, filtering, the filtering comprising: filtering out unique IDs, shortcodes, and/or or numeric IDs, and replacing them with wildcards, prior to comparing the two client-side representations.

The filtering can be considered to be part of a preprocessing step applied to the interpreted code prior to comparison. Interpreted code may be filtered and then snapshots obtained from the filtered interpreted code. Advantageously, filtering prevents user-specific variables from being registered as changes, so that changes are restricted to the generic form of the web page.

The same filtering may be applied to target URLs in checking whether a URL selected by a user as a target URL already exists (i.e. a time series of client-side representations of the target URL already exists) in the data store. Advantageously, this mitigates the risk that target URLs comprising user-specific variables are registered as distinct webpages.

Optionally, the computing apparatus is configured to, in obtaining the first client-side representation, respond to instances of javascript in the code from the target URL by triggering an in-page activation, the first client-side representation comprising an image or text portion representing the in-page activation.

The representation of the in-page activation may be generic or may access generic data so that it is identical across different representations of the same web page. In this manner, changes by user-specific or time-specific variables can be prevented from being registered as changes at the comparing stage.

Optionally, the computing apparatus is further configured to: identify any further URLs accessible as links in the acquired code from the target URL, and for each further URL, to execute the process with the further URL as the target URL. And optionally the computing apparatus is configured to execute the process on a repetitive basis with the further URL as the target URL.

Such embodiments provide a mechanism for building up a list of target URLs for processing, so that all pages (or all pages within a flow) of a website or webapp can be analysed by the application.

Optionally, the application is configured to receive a series of URLs associated in a flow, to execute the application with each of the series of URLs as the target URL, to associate the stored client-side representations of the URLs to one another with an indication that the URLs belong to a common flow.

Advantageously, such embodiments provide a mechanism for a user to review a flow of URLs in order to identify unusual or undesirable performance indicators among members of the flow. For example, the flow may be a series of web pages of a website or webapp accessed by a user in a session. Each target URL has an entry in a data store. The indication may be a logical link between the entries of target URLs belonging to a common flow. The common flow may have an ID and the application may be configured to generate and store statistics for the flow as a collective of web pages, which statistics are accessible to a user and identifiable via the ID.

Embodiments include a computing apparatus according to any of the preceding claims, wherein the computing apparatus comprises memory hardware and processor hardware, the memory hardware being configured to store processing instructions which, when executed, implement the application, and the processor hardware being configured to execute the processing instructions in association with the memory.

Embodiments include a computing-implemented method, comprising: executing an application, the application being configured, when executed, to perform a process for one or more web browser applications, each web browser application being configured, when executed, to receive an input URL and to acquire code from a web server location identified by the input URL, and to generate a client-side representation of the acquired code, the process comprising: causing the web browser application to execute with a target URL as the input URL; obtaining, as a first client-side representation, a client-side representation of the acquired code as generated by the web browser application; obtaining, as a second client-side representation, a second client-side representation of code acquired from the target URL; calculating a difference metric indicative of a difference between the first client-side representation and the second client-side representation; comparing the difference metric with a threshold, and based on a result of the comparison: causing an analytics script to run on the target URL to obtain a set of one more performance indicators; and causing the first client-side representation to be stored in association with the one or more performance indicators.

Embodiments include a computer program configured, when executed by a computing apparatus, to perform the computer-implemented method.

Embodiments include a computer program, configured, when executed by a computing apparatus, to perform a process for one or more web browser applications, each web browser application being configured, when executed, to receive an input URL and to acquire code from a web server location identified by the input URL, and to generate a client-side representation of the acquired code, the process comprising: causing the web browser application to execute with a target URL as the input URL; obtaining, as a first client-side representation, a client-side representation of the acquired code as generated by the web browser application; obtaining, as a second client-side representation, a second client-side representation of code acquired from the target URL; calculating a difference metric indicative of a difference between the first client-side representation and the second client-side representation; comparing the difference metric with a threshold, and based on a result of the comparison: causing an analytics script to run on the target URL to obtain a set of one more performance indicators; and causing the first client-side representation to be stored in association with the one or more performance indicators.

Embodiments include a non-transitory computer-readable storage medium storing a computer program of an embodiment.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Embodiments are described below, purely by way of example, with reference to the following drawings, in which:

FIG. 4A illustrates a technique for accessing the application from a web browser application of an embodiment;
FIG. 4B illustrates a mechanism for inputting a flow of URLs to an embodiment;
FIG. 5C illustrates a page search interface of the application of an embodiment;
FIG. 5D illustrates a page search interface of the application of an embodiment;
FIG. 7A illustrates a first client-side representation of an embodiment;
FIG. 7B illustrates a second client-side representation of an embodiment;
FIG. 7C illustrates a difference image of an embodiment;
FIG. 9A illustrates an interface of an embodiment;
FIG. 9B illustrates a further interface of an embodiment.

DETAILED DESCRIPTION

Embodiments include at least a program, computer-implemented method, program, and computing apparatus.

Figure 1:
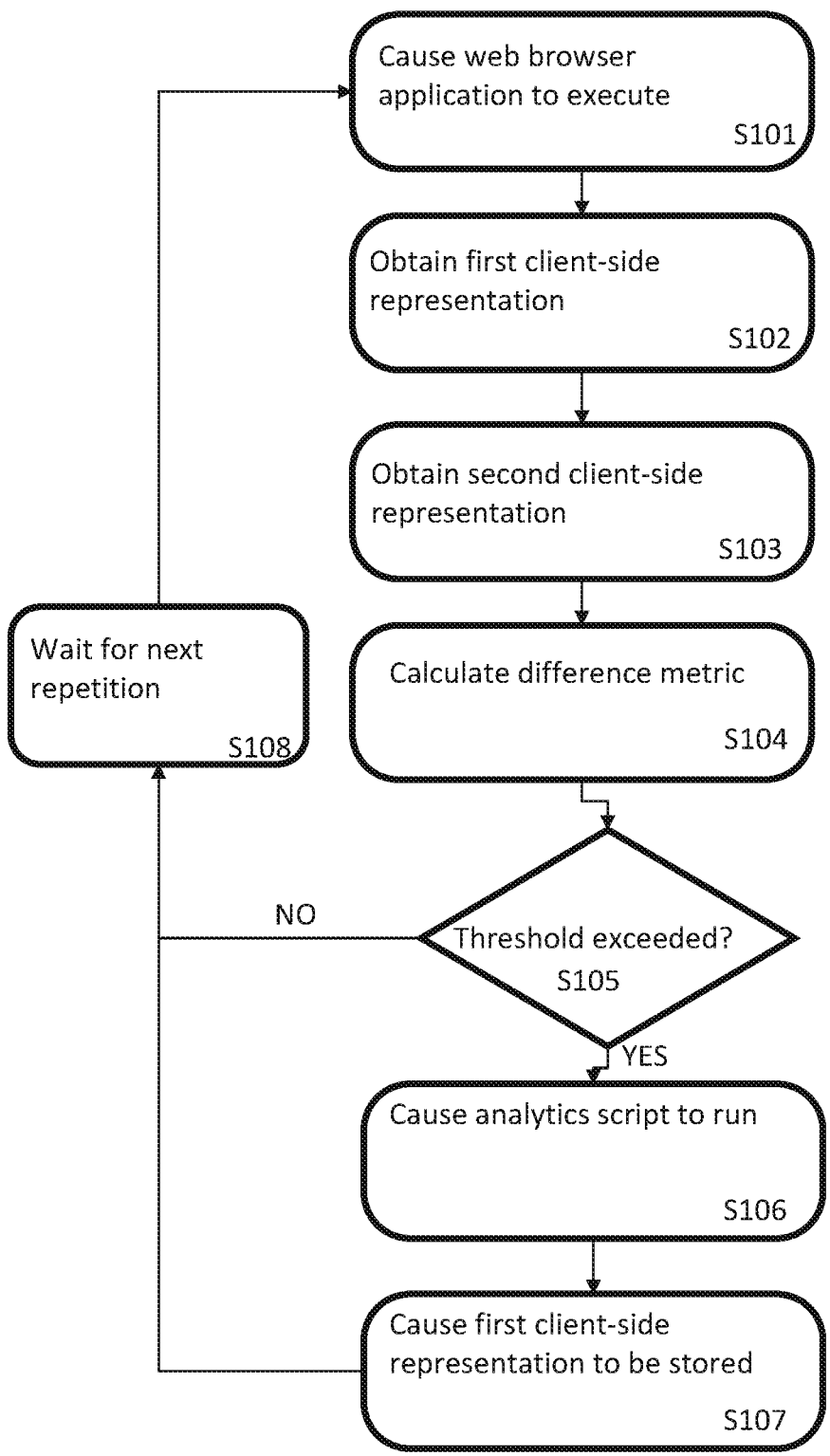
FIG. 1 illustrates a process of an embodiment.
Figure 2:
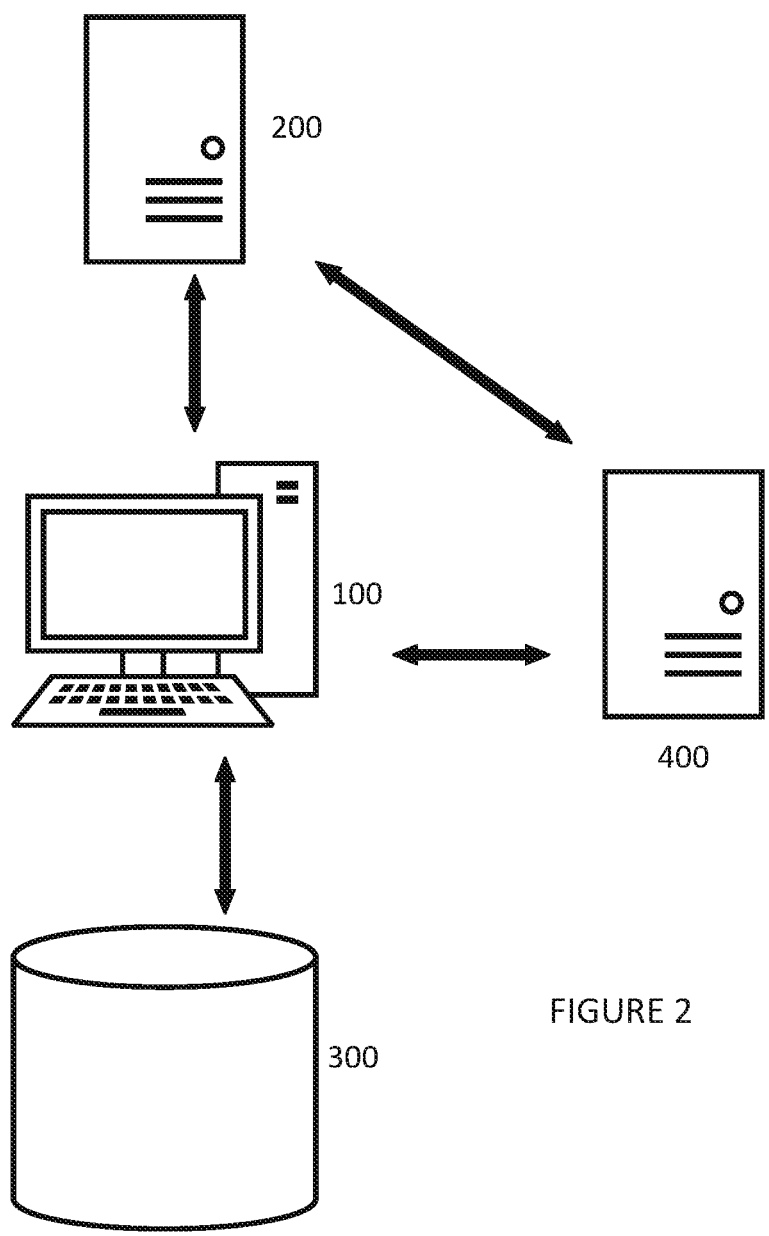
FIG. 2 illustrates a hardware arrangement of an embodiment.

Embodiments, irrespective of implementation, perform a process illustrated in FIG. 1. A computing apparatus 100 for performing the process and associated tasks is illustrated in FIG. 2. The computing apparatus 100 may be a single computer or a network of interconnected computers. The computing apparatus 100 may be a computing device configured to act as a client in a relationship with a web server 200 hosting one or more web pages. The arrow between the computing apparatus 100 and the web server 200 represents the request for a web page from the web browser application on the computing apparatus to the web server 200, and the transmission of code (and optionally other content) from the web server 200 to the computing apparatus 100 in response to the request. The computing apparatus 100 may include or be able to access a data store 300 such as a database storing at least historical client-side representations (for example, as time series) of one or more web pages (wherein a web page is a client-side representation of code acquired from the server-side). The computing apparatus 100 may be configured to make read and write access to the data store 300 or database, as illustrated by the arrow between the two entities in FIG. 2.

The computing apparatus 100 includes at least processor hardware and memory hardware, and may further include a network interface, a display unit, and I/O devices.

Embodiments may utilize a third party analytics script provider 400 storing and executing analytics script(s) under instruction of the computing apparatus 100. For example, the third party analytics script provider 400 receives a request for one or more performance indicators and a target URL from the computing apparatus 100 (illustrated by the arrow between 100 and 400 in FIG. 2) and responds by requesting the web page from the target URL at web server 200, receiving the content required to render and display the web page from the web server 200 (and optionally further information from the web server 200 or from a performance statistics database), running one or more analytics scripts, and replying to the computing apparatus 100 with the requested performance indicators.

The computing apparatus 100 is configured to store and execute one or more web browser applications, each web browser application being configured, when executed, to receive an input URL (the target URL being an example of an input URL) and to acquire code from a web server location 200 identified by or determined by the input URL, and to generate a client-side representation of, for example by constructing and/or rendering, the acquired code. The acquired code can be referred to as raw code or raw source code, which, in generating the client-side representation, is constructed and/or rendered. In cases in which there are more than one web browser application, the browser applications may be from one or more software provider (e.g. may be one or more from among Mozilla Firefox, Microsoft Edge, Apple Safari, Microsoft Internet Explorer, Google Chrome), and there may be plural versions of each web browser application, so that, for example, a latest version of the web browser application is stored and executed in addition to one or more earlier versions. For the purposes of embodiments, different versions of the same web browser application may be treated as the same web browser application, so that, for example, rendered code versions created by the latest version of Google Chrome available at the time of generating the respective client-side representations are compared with one another as though artefacts of the same web browser application.

The web browser applications may comprise a first web browser application configured to identify as a desktop or laptop web browser when acquiring the code from the web server location identified by the input URL; and a second web browser application configured to identify as a mobile device web browser application when acquiring the code from the web server location identified by the input URL, and to emulate a mobile device web browser when generating the client-side representation of the acquired code. For web browser applications designed to run on specific operating systems that are not the operating system being run by the computing apparatus 100, the computing apparatus 100 may run the web browser application within a virtual environment emulating the specific operating system of the web browser in question. In this manner, the computing apparatus 100 may present itself as a mobile device to the web server 200 in order to obtain a mobile version of the web page. It is noted in such cases that the computing apparatus 100 will obtain an image representation of the acquired code based on a display unit having the resolution and dimensions of a mobile device rather than the monitor of the computing apparatus 100 itself.

The web browser applications are executed under the control of an application. The application executes the web browser application(s) and inputs a URL or series of URLs to the web browser applications as target URLs to browse with the web browser application(s). The application is configured to extract artefacts from the executed web browser applications, including, for example, interpretations of the code acquired from the target URL (such as DOMs and CSSOMs and render trees) and renderings of those interpretations (such as snapshot images of a webpage as displayed to a user via a browser window).

An advantage of embodiments is the development of a database, archive, or store, of client-side representations of webpages. A further advantage is the association of client-side representations of code acquired from a target URL with relevant performance indicators. To this end, it can be appreciated that the process performed by the application (executing the web browsers, determining whether to store artefacts, obtaining and storing performance indicators) may be performed repetitively for further advantage. Repetitions may be event triggered, for example in response to a user input such as a systems engineer, may be scheduled, and/or may be repeated periodically according to a predefined (and optionally user-controlled) period such as daily, weekly, fortnightly, monthly, etc.

An exemplary process performed by the application is illustrated in FIG. 1. In embodiments in which plural web browser applications are being utilized, the process is independent per web browser application. So it is repeated for each web browser application being utilized, and the comparisons are not conducted across plural web browser applications.

The process includes, at S101, causing the web browser application to execute with a target URL as the input URL, and, at S102, obtaining, as a first client-side representation, a client-side representation of the acquired code as generated by the web browser application. The target URL is the URL that will be input to the web browser application as an address to which the web browser application should browse to acquire at least some code. That is, the target URL determines at least some of the code that is acquired from the server side by the web browser application, by specifying a specific server side location at which code is accessible to the web browser application. The target URL may be selected by a user, for example as a text input to the application. Alternatively the target URL may be selected by pressing a button or other actuator embedded in the web browser application by means of a plugin, or other functionality extension to the web browser application, configured to select a current URL from an address bar of a web browser application as a target URL for the application. The application may crop selected URLs, for example by removal of IDs and shortcodes, prior to performing the process.

The first client-side representation is referred to as such since it is obtained via a web browser application which is configured to act as a client in a client:server relationship with a web server 200 hosting the webpage identified by the target URL. It is a representation indicative of the code acquired from the target URL, and, contrary to the code stored on the web server 200 (which can be considered a server-side representation), it is a representation of the code as manifest at the client side. The first and second client-side representations, may be snapshot images of a webpage as displayed by the respective web browser application by interpreting and rendering the acquired code. Snapshot images are screenshots insofar as they illustrate the displayed state of the web page at the client side at an instant in time. The actual display on a display unit is not necessarily required; the application may be configured to extract the rendered webpage from the operating system without necessarily requiring the presence of a display unit.

The first and second client-side representations, may be text representations of the respective acquired code as interpreted by the respective web browser application. For example, the representation may be the interpreted code, including for example, a document object model or a CSS object model obtained from the acquired code. The text representation may be a render tree. A render tree is a collective term embodying both the document object model and the CSS object model.

For example, the first client-side representation may be either or some combination of: a text manifestation of the code acquired from the target URL as interpreted by the web browser application such as a render tree or the like (referred to as text representation); a snapshot image (referred to as image representation) of the rendered web page for display in a window of the web browser application, the rendered web page being generated by the web browser application by rendering the text representation, or a cropped version of said snapshot image. Embodiments may obtain a multi-modal client-side representation comprising the text representation and the image representation.

Which type (text/image/multi-modal) of client-side representation is obtained is user-configurable at initiation of the process (i.e. in preparation for first repetition of the process) and is fixed for repetitions of the process pertaining to a particular target URL in order that the first client-side representations (which are obtained on-the-fly/live/in real-time) are comparable with the second client-side representations (which are, for example, stored from previous repetitions of the process).

The process further includes, at S102, obtaining, a second client-side representation of code acquired from the target URL. The second client-side representation is a reference version. The second client-side representation may be, for example, a most recent representation from among a stored time series of client-side representations of code acquired from the target URL. The time series is a plurality of time stamped client-side representations of code acquired from the target URL obtained at previous repetitions of the process. Noting that at initiation a client-side representation of the code acquired from the target URL may be obtained and stored (wherein initiation may be the input of a new target URL to the application). In the first performance of the process for a given target URL, said stored representation may be the only stored representation and hence is the second client-side representation.

The process further includes, at S104, calculating a difference metric indicative of a difference between the first client-side representation and the second client-side representation (for example, representative of a level of difference or dissimilarity between the two). The nature of the calculation will depend upon whether the client-side representations are text representations, image representations, or multi-modal representations. The calculation may use an algorithm such as image diff to quantify the difference between two image representations. The calculation may compare two text representations to identify in the first client-side representation text that is newly added or deleted using the second client-side representation as a baseline, and quantifying these changes (for example, extent of changes in terms of words or characters as a proportion of document length). In the multi-modal representation case, the difference metric may be an average of the image difference and the text difference, or a weighted combination of the two.

The process further includes, at S105, comparing the difference metric with a threshold (i.e. comparing the result of S104 with a threshold). The threshold may have a default value, such as 0, or, if the difference metric is a percentage, 0%, or 1%, or 10%. The threshold may be set by a user and may be configured between repetitions according to user preference.

The first and second client-side representations may be multi-modal representations comprising a text representation of the respective acquired code as interpreted by the respective web browser application and a snapshot image of a webpage as displayed by the respective web browser application by interpreting and rendering the acquired code; and the difference metric comprises a contribution from each of an image differentiating algorithm comparing the snapshot images and a text differentiating algorithm comparing the text representations. For example, the contributions may be combined as a weighted average. Alternatively, a hierarchy may be implemented so that at a first instance the text representations are compared by a text differentiating algorithm and the result compared with a first threshold, and if the first threshold is met (i.e. the amount of change is equal to or more than the threshold), then the flow proceeds to a second instance and the image representations are compared by an image differentiating algorithm and the result compared with a second threshold, and if the second threshold is met then it is determined yes at S105. If the first threshold or the second threshold is not met, then it is determined no at S105.

If the threshold is exceeded (wherein exceeded may be by greater than only or by equal to or greater than), embodiments further comprise: at S106, causing an analytics script to run on the target URL to obtain a set of one more performance indicators; and at S107, causing the first client-side representation to be stored in association with the one or more performance indicators. For example, the first client-side representation may be added to a stored time series of client-side representations corresponding to the target URL, in association with metadata including a time stamp and the set of one or more performance indicators.

The application performs a comparison between the calculated value of the difference metric and the threshold. If the result of the comparison at S105 is that the threshold is not exceeded, the flow proceeds directly to S108 and the analytics script is not caused to run. Optionally, a timestamp recording a time of the latest performance of the process on the target URL is associated with an entry or time series pertaining to the target URL in the data store 300. The repetition is completed and flow proceeds to S108 to wait for the next repetition. Repetitions may be event triggered, for example in response to a user input such as from a systems engineer, may be scheduled, and/or may be repeated periodically according to a predefined (and optionally user-controlled) period such as daily, weekly, fortnightly, monthly, etc.

The analytics script may be stored on the computing apparatus 100 and executed thereby, or may be remote. Alternatively the analytics script may cause local and remote procedures to run in order to obtain a set of performance indicators. For example, the analytics script may be provided by a third-party provider 400 (i.e. not the computing apparatus 100 provider or the website provider). An example of such an analytics script is Google Analytics. A further example is Lighthouse. The analytics script may be a script that causes performance indicators to be calculated by more than one different analytics provider. For example, performance indicators may be calculated by Google Analytics and by the computing apparatus 100 itself (or a computing apparatus belonging to the same legal entity). Performance indicators may assess usage of the web page, may assess the code stored on the web server 200, may assess the client-side code, interpreted code, or code artefact(s), may assess a document object model representation of the web page, may assess a CSS object model representation of the web page, and may assess the displayed version of the rendered code.

Exemplary performance indicators include:

Load time or speed, which may be expressed as time taken from request to page being fully painted/loaded, and/or time to first meaningful paint (first meaningful paint is the time at which the page a user/client sees transitions from white screen to a screen showing content downloaded from the web server 200 or content showing in accordance with code downloaded from the web server 200);

Carbon cost of page load, which is a performance indicator calculated by calculating the energy consumed by the web server 200 and/or the client device in requesting the web page, transmitting the requested web page over a network, and compiling the rendered code, and associating the consumed power with a carbon cost per unit energy consumption. The carbon cost per unit energy consumption may be configurable by the user (of the computing apparatus performing the process) according to one or more variables including web server 200 hosting information;

Energy cost of page load, which is a performance indicator calculated by calculating the energy consumed by the web server 200 and/or the client device in requesting the web page, transmitting the requested web page over a network, and compiling the rendered code.

Weight of page, which is a performance indicator assessing the amount of data that is transferred from the web server 200 to the client (i.e. requesting device) in order to display the web page;

CSS class usage for one or more CSS classes of interest, which is a performance indicator obtained by searching the document object model and/or the CSS object model representation of a page. Examples may be proprietary CSS classes that a web site uses, wherein for each page of the website (i.e. for each target URL) and for each CSS class of interest, the analytics script returns, as a performance indicator, the version of the CSS class used on the page. This may be achieved, for example, by text analysis of a text representation of the web page such as a CSS object model or a document object model;

An accessibility metric, being a metric representing accessibility of an image representation of the rendered code version for cognitively-impaired users, motor or dexterity-impaired users, hearing-impaired users and/or for visually-impaired users or the like. For example, the accessibility metric may be based on a displayed version of the webpage (i.e. a snapshot or screenshot), or a cropped version thereof. Exemplary tools for obtaining such a metric include Lighthouse.

Daily weight, which is a product of average weight of page load (the amount of data that is transferred from the web server 200 to the client (i.e. requesting device) in order to display the web page) and average number of unique visitor loads per day (since last repetition or over some other predefined time period);

A performance score obtained as a weighted average of a plurality of individual component scores. Such a performance score may be provided by a third-party tool such as Lighthouse performance scoring. The individual component scores in a performance score may be one or more from among, for example: time to first contentful paint (first contentful paint marks the time at which the first text or image is painted), speed index (speed index indicates how quickly the contents of a page are visibly populated), largest contentful paint (represents the render time of the largest image or text block visible within the viewport, relative to when the page first started loading), time to interactive (time to interactive is the amount of time it takes for the page to become fully interactive), total blocking time (is the sum of all time periods between first contentful paint and time to interactive, when task length exceeded 50 ms, expressed in ms), and cumulative layout shift (measures visual stability by measuring sum total of individual layout shifts i.e. any time a visual element changes its position from one rendered frame to the next or another).

The performance indicators are only calculated when the client-side representation of the code acquired from the target URL has changed sufficiently since the latest stored representation to exceed the threshold. This avoids obtaining performance indicators unnecessarily.

In addition to causing the performance indicators to be calculated, exceeding the threshold may result in a latest version of the client-side representation of the code acquired from the target URL being added to a time series of client-side representation of the code acquired from the target URL in the data store 300, with a timestamp indicating time of performance of the process (various options exist for selection of precise timing including, for example, time of acquisition of code from web server 200, time of initiation of process, time of comparison with threshold, time of writing new representation to data store 300).

The performance indicators are stored as part of an entry in the data store 300 pertaining to the particular target URL (i.e. the data store 300 comprises one entry per target URL, the entry may comprise one or more client-side representations of the target URL, performance indicators, and optionally further metadata). The performance indicators may be stored in association with (i.e. as a property of) the target URL itself or a particular member of a time series. In the former case, a user of the data store 300 may assume that stored performance indicators for a target URL correspond to the most recent representation in the time series. In the latter case, a user of the data store 300 is able to access performance indicators for each client-side representation of the code acquired from the target URL in the time series.

There may be plural time series for each target URL. In such embodiments, the plural time series for target URL are updated contemporaneously in accordance with the process of FIG. 1. For example, in addition to the first client-side representation of the web page stored as a time series, a time series of document object models of the web page, CSS object models of the web page, render trees of the web page, screenshots of displayed versions of the web page, code acquired from the target URL from the web-server, client-side code version(s) or code artefacts of the web page. It is further noted that each time series may be maintained (i.e. stored and added to) per web browser application.

After writing the new client-side representation (and optional additional artefacts) and performance indicators to the data store 300 at S107, the repetition is completed and flow proceeds to S108 to wait for initiation of the next repetition.

In addition to S107 and S108 being performed as a consequence of a positive determination at S105, one or more further steps may be performed, including raising an alert to a registered alert recipient. The alert may indicate at least the target URL, an indication that the client-side representation of the target URL has changed more than a predefined threshold amount of change, and optionally also a result of the comparison between the first and second client side representations. Such a result may be a value of a difference metric or may be an image or text document illustrating or highlighting points of difference between the two representations. The mechanism for the alert may be a messaging mechanism such as email, SMS, or voicemail.

At a first performance of the process for a particular target URL, the process is performed with steps S101, S102, S106, S107 & S108 only. From the second performance (i.e. the second repetition) onwards, steps S103 to S105 are included so that the process comprises steps S101 to S108.

Figure 3:
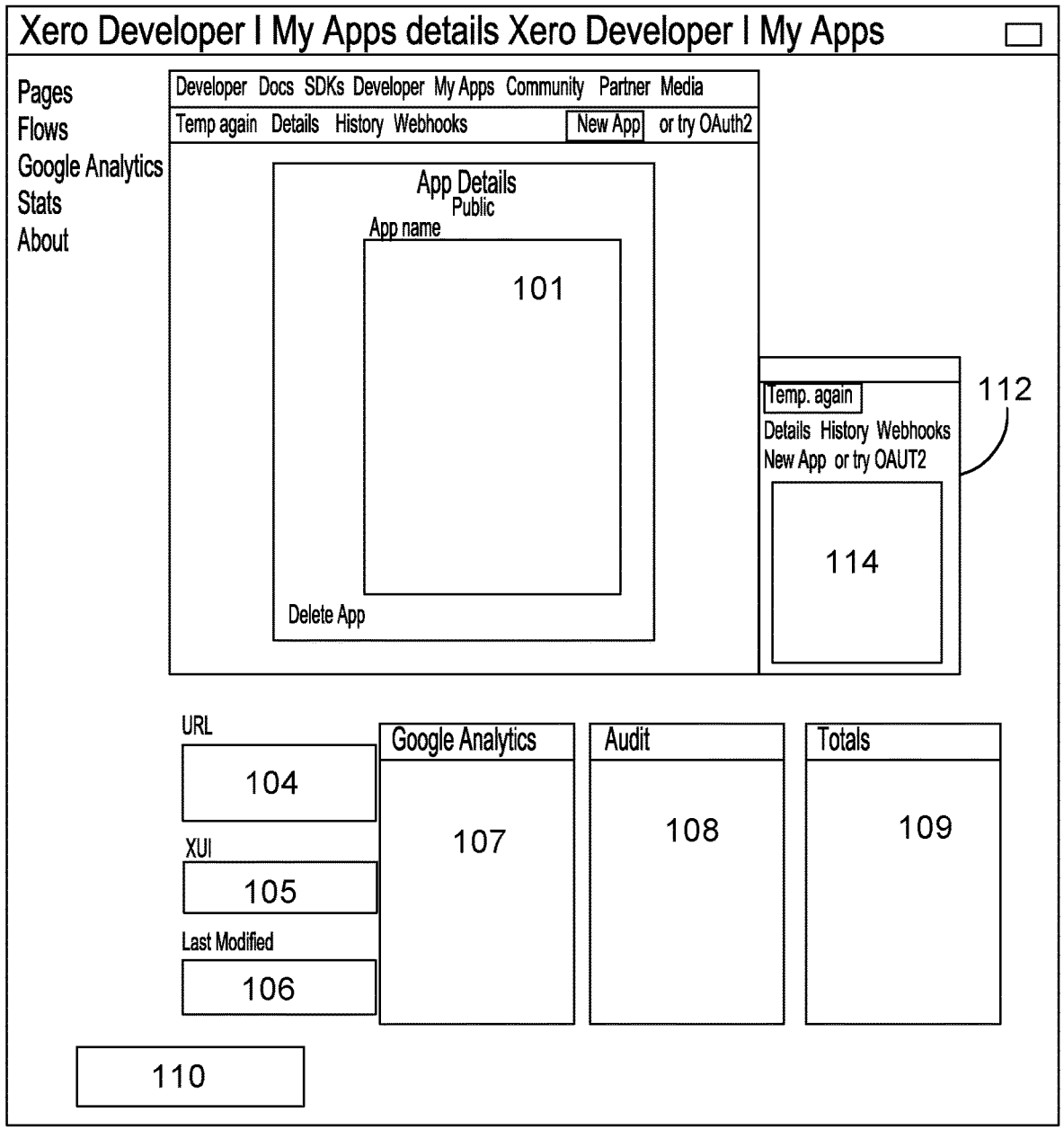
FIG. 3 illustrates a user interface of an application of an embodiment.

FIG. 3 illustrates a screenshot taken from a user interface of the application, as executed by the computing apparatus 100. The target URLs being analysed by the application in the example depicted in FIG. 3 are target URLs forming part of a web application. A portion 101 of the UI enables a user to enter details for use by the application in accessing a target URL. The portion 101 may contain one or more individual fields each allowing input by a user of a parameter for use by the application in accessing a target URL. The URL of an individual page within the website is detailed at 104, which may be a field into which a user of the user interface can input a target URL (either as a freeform entry field or a pre-loaded selectable list with all target URLs from within the website/webapp for which client-side representations are stored in the data store 300).

At field 105 the application displays a version of a proprietary CSS class used in the code acquired from the target URL shown in 104. At field 106 a timestamp of the most recent representation of the URL added to the time series in the data store 300 is displayed. The timestamp represents the last performance of the process illustrated in FIG. 1 at which the amount of change (with respect a reference, second, client-side representation) on the first client-side representation of the code acquired from the target URL shown in 104 satisfied the threshold.

Further information from the data store is displayed at 107, in this example performance indicators obtained from Google Analytics at the timestamp shown in field 106. In another example the Google analytics performance indicators 107 may be from a specified time period other than the timestamp shown in 107. Such performance indicators may include average time on page per user, unique page views over a given time period, page views over a given time period. At 108 further performance indicators are illustrated, in this instance the performance indicators are obtained running a proprietary (rather than a third party) analytics program to obtain performance indicators including time to first meaningful paint, speed index, page weight, an overall performance metric, and an accessibility metric. At 109 further performance indicators are displayed, including daily weight and total time loading. Via button 110 a user of the application can access historical document object model representations of the target URL.

112 is a user interface of a UI of the application intended for display on a mobile device. A portion 114 of the UI enables a user to enter details for use by the application in accessing a target URL. The portion 114 may contain one or more individual fields each allowing input by a user of a parameter for use by the application in accessing a target URL.

FIG. 4a illustrates a technique for accessing the application from a web browser application, and for adding new target URLs to the application for processing. FIG. 4b illustrates a further technique for adding target URLs to the application. At S410 a URL is selected. The selection may be directly into a user interface of the application via a text entry field. Alternatively, the application may comprise a plugin or bookmarklet for a web browser application so that a user can navigate to a URL and then activate the plugin or bookmarklet with the current URL to which the address bar of the web browser application is pointing being extracted and input as the selected URL (i.e. selected for addition as a target URL). The application checks whether an entry (e.g. a time series of client-side representations) for the selected URL exists in the data store 300 (i.e. has the application yet executed the process with the selected URL as target URL?).

Figure 4C:
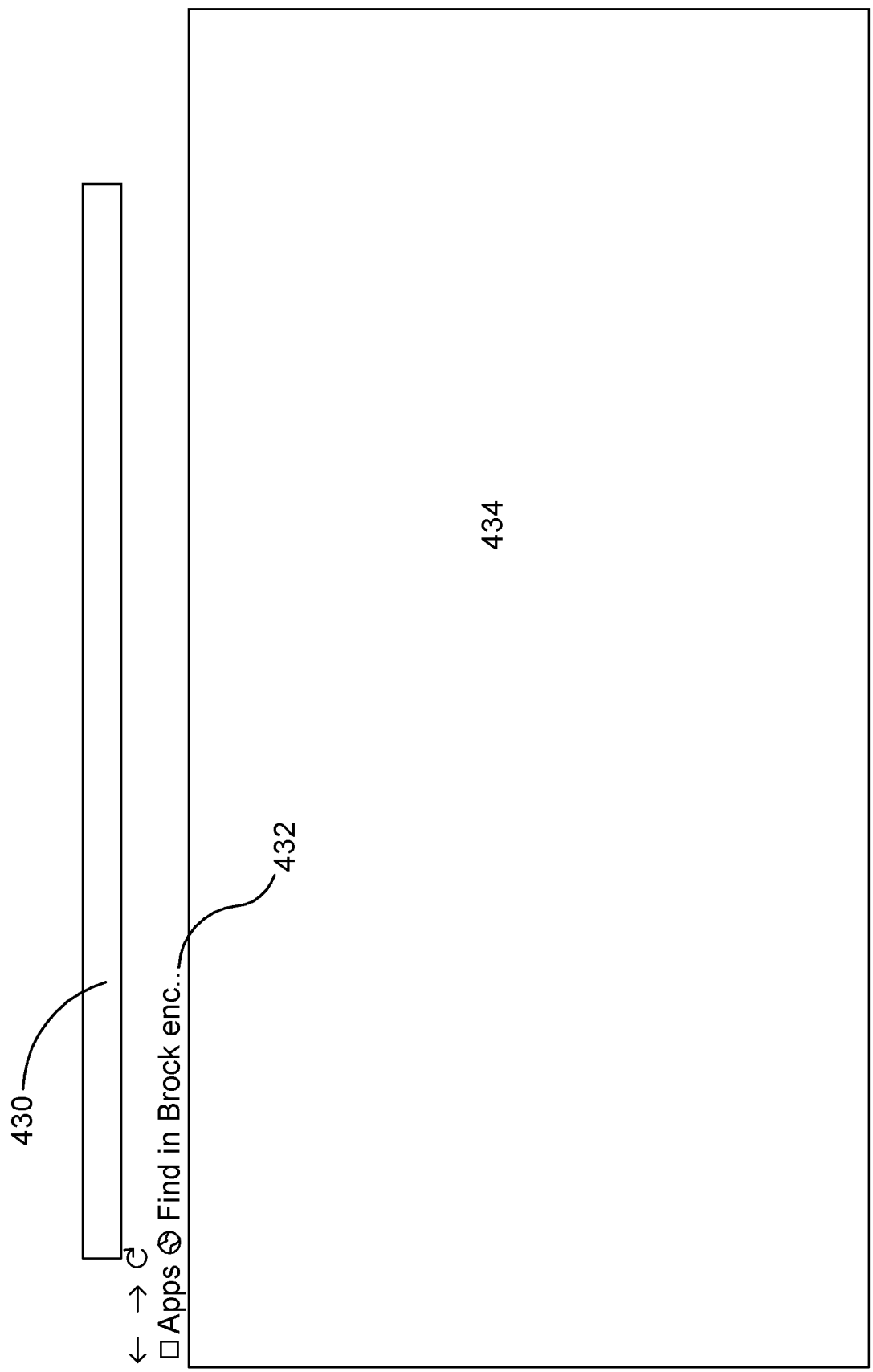
FIG. 4C illustrates a user interface of a web browser application of an embodiment.
Figure 4D:
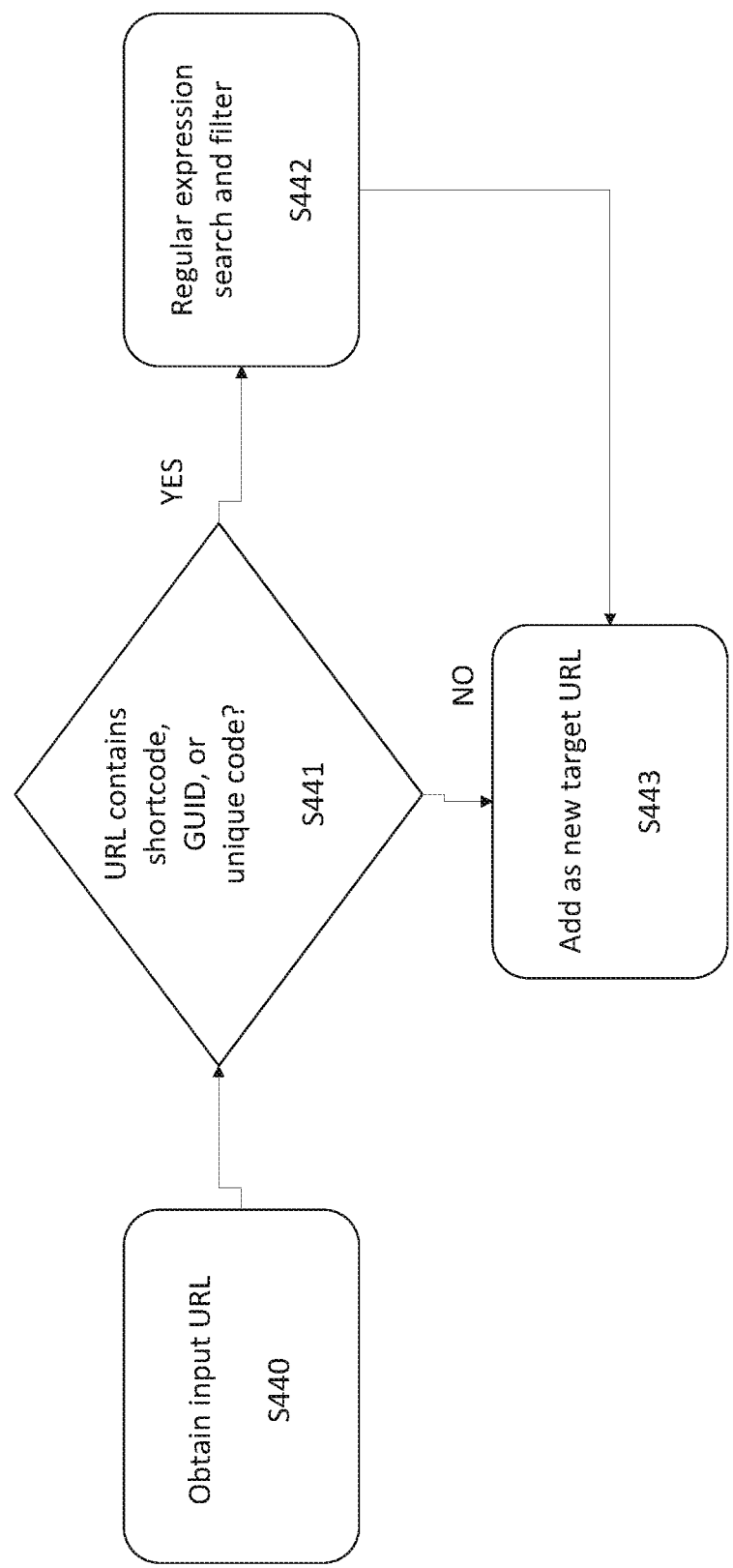
FIG. 4D illustrates processing performed by the application upon input of a URL via a bookmarklet of an embodiment.

FIG. 4C illustrates a user interface of a web browser application in which a bookmarklet 432 enables a user to input the URL which the web browser application is currently accessing (as illustrated by the URL bar 430) to the application (named Brock in this particular example) as a target URL. The rendering of the webpage is displayed in browser window 434.

s FIG. 4D illustrates processing performed by the application upon input of a URL via the bookmarklet. At S440 a URL is captured from the web browser application as a consequence of a user activating the bookmarklet while the web browser application is navigated to the URL. The application may execute a web browser application with the captured URL to verify that there is any content before proceeding with processing. At S441 a check is performed by the application to determine whether the URL contains shortcode, GUID, or any other of predetermined forms of unique code (which may be selectable by a user as operating parameters of the application). In response to a positive determination at S441, the flow proceeds to S442, at which a regular expression search is performed to locate and remove the shortcode, GUID, or unique code leading to the positive determination at S441 (and any other shortcode, GUID, or unique code in the URL). The flow then proceeds to S443 at which the URL (post-filtering) is stored by the application in a queue of target URLs to be processed. An entry in the data store is thereby initiated for the URL. In response to a negative determination at S441, the flow proceeds directly to S443 and the URL (without filtering) is stored by the application in the queue of target URLs.

Returning to FIG. 4a, if yes at S410, then at S411 the application activates a user interface such as that illustrated in FIG. 3, with the selected URL as the URL 104. The application may itself be a web application, in which case it may open as a new tab in the web browser application. In a desktop application implementation the application may open as a new window.

If no at S410, then at S412 the selected URL is added to a list or queue of target URLs. The user may be presented with an interface showing the list or queue of target URLs for configuration (i.e. re-ordering, re-scheduling, removal of target URLs, addition of more new target URLs). The flow proceeds to S413.

At S413 a check is performed for an existing analytics record (that is, performance indicators from an analytics script such as the analytics script of S106). If an existing analytics records exists (either in data store 300 or at a third party analytics provider, or in another location), then the application associates the target URL with the analytics record so that the user interface screen for the target URL (such as illustrated in FIG. 3) can include a link to the analytics record.

As illustrated in FIG. 4B, embodiments provide a mechanism for a series of URLs connected as a flow to be input to the application as target URLs. The flow is a flow through a website or webapp. In other words, the flow may be indicative of a user accessing a series of individual pages (i.e. a series of target URLs) of the website or webapp in series by following links within an individual page in the series or otherwise causing the browser to navigate to a next page in the series (wherein a web page is a client-side representation of code acquired from the server side). The application is configured to receive a series of URLs connected to one another in a flow through a website or webapp, to execute the application with each of the series of URLs as the target URL, to associate the stored time series of client-side representations of the URLs to one another with a user-readable indication that the URLs belonging to a common flow.

For example, at S420 the user navigates through a website or webapp by following links within individual web pages or otherwise causing the web browser application to load a next page. The URLs of the individual web pages may be recorded by the web browser application, for example as browser history. The application may comprise a plugin running within the web browser with an actuator, such as a button, that when actuated causes the series of URLs to which the web browser has navigated to be added to the application as a linked series of URLs, or a flow. An interim URL processing step is performed at S421 at which the application checks each of the URLs for GUID, shortcodes, or numeric IDs. For any GUIDs, shortcodes, or numeric IDs found, the application removes them from the respective URL and replaces them with a wildcard so that all appropriate pages can be found in the data store. The series of URLs are added to the application as target URLs, with an indication that they belong to a common flow.

At S422, for any of the series of URLs for which an entry does not already exist in the data store 300, the URL is added to a queue, and the application processes the URLs in the queue by creating an entry for the URL and populating the entry with a first client-side representation and performance indicators (i.e the process of FIG. 1 is performed but omitting steps S103 to S105 on this initiating repetition).

At S423, for each URL in the queue, a check is performed for an existing analytics record (that is, performance indicators from an analytics script such as the analytics script of S106). If an existing analytics records exists (either in data store 300 or at a third party analytics provider, or in another location), then the application associates the URL from the queue with the analytics record so that the user interface screen for the target URL (such as illustrated in FIG. 3) can include a link to the analytics record.

Figure 5A:
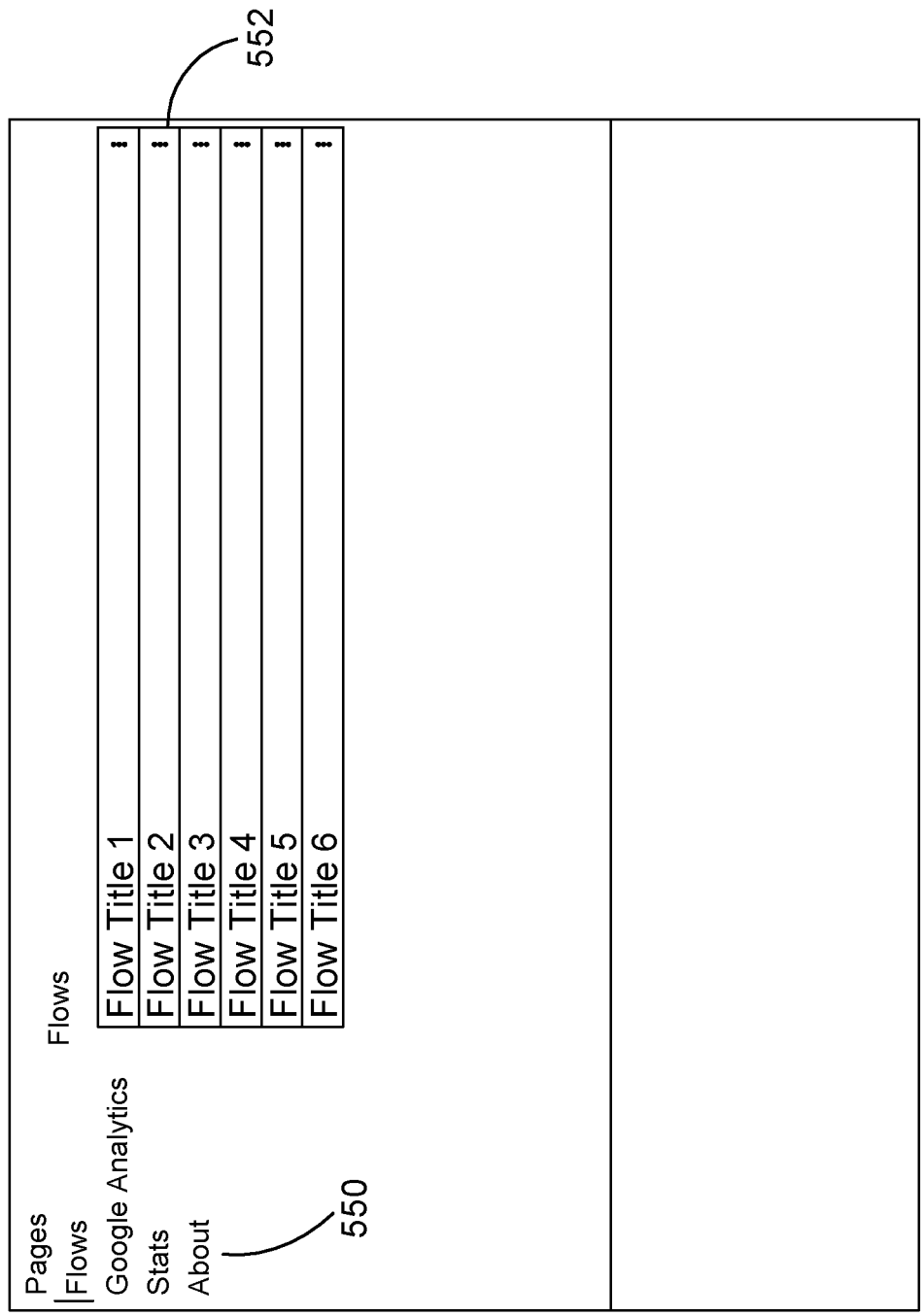
FIG. 5A illustrates a list view of a flows interface of the application of an embodiment.

At S424, the respective entries for the series of URLs are stored with an indication (i.e. visible via the UI of the application) that they belong to a common flow. FIG. 5A illustrates a list view of a flows interface of the application. The selected interface is indicated by the tab 550. The flows interface lists the flows associated with the web app or web site. A flow is a subset of the web pages, typically belonging to the website or web app, and having entries in the data store 300. In addition to being a logical link between plural data entries in the data store 300, the flow is represented in the application by some statistics pertaining to the pages of the flow collectively. A flow is identified by its flow title, which may be automatically generated (for example, the title of the first page of the flow and the title of the last page of the flow) or may be a title attributed to the flow by a user in the UI for the particular flow. A flow is a series of web pages logically linked, for example by being visited in series in a recorded user session, or linked as a series in some other way, for example by a user of the application selecting plural web pages and marking them as belonging to a flow.

Figure 5B:
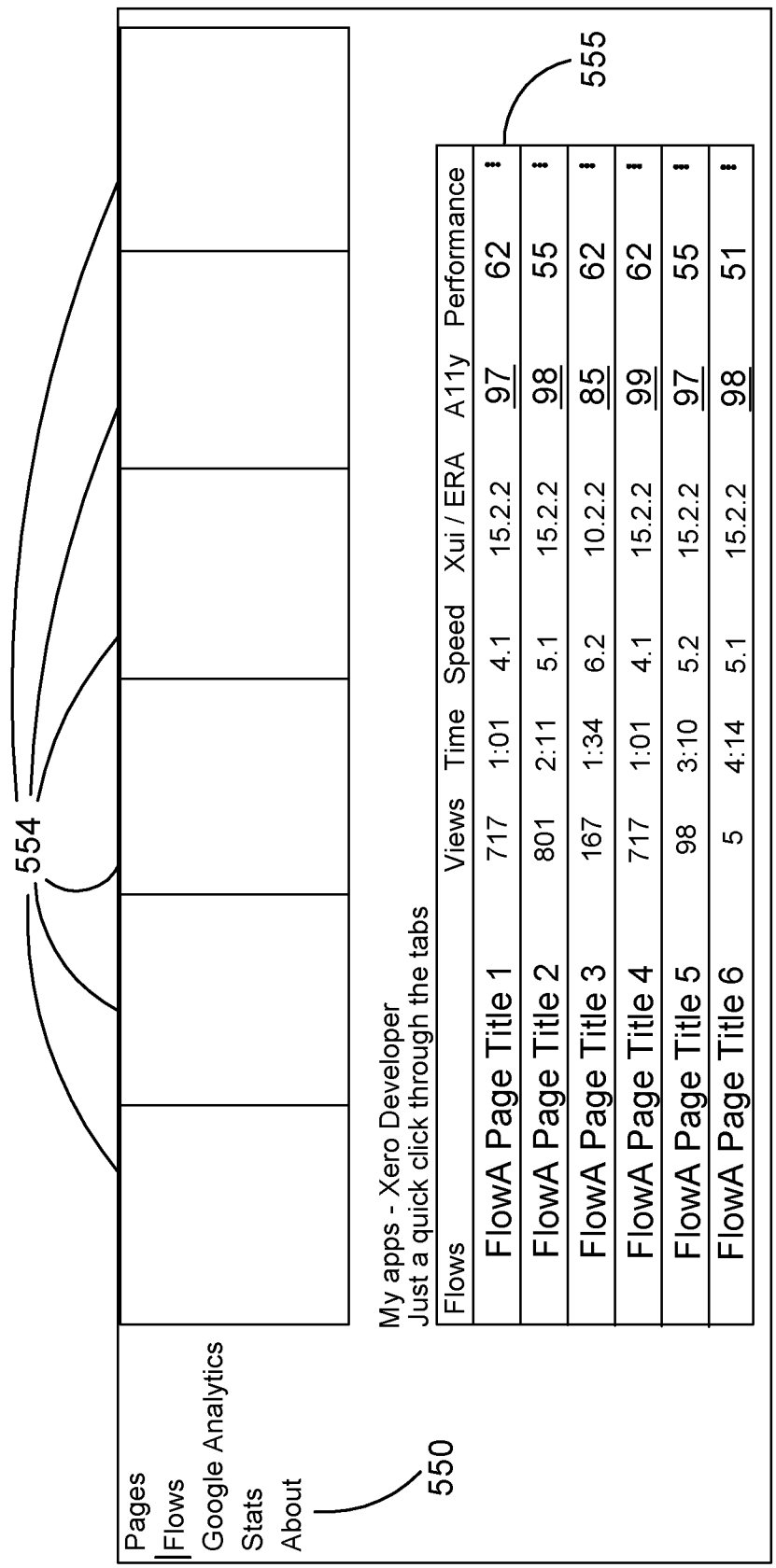
FIG. 5B illustrates a view of an embodiment relating to an exemplary flow.

The application may also comprise a UI for each flow (accessible via the dots 552 per flow title in FIG. 5A), wherein the UI for a flow enables a most recent entry of the respective time series, and performance indicators for all component web pages in the same flow to be viewed in a single view (as illustrated in FIG. 5B). Flows may be identified by their start and/or end URL. Flows may be identified by a user-assigned title. The individual web pages belonging to the flow may be illustrated in scaled-down screenshots, or thumbnails, 554. A table 555 indicates performance indicators for each target URL composing the flow. In the present example, the columns of the table are title, views, time, speed, Xui/Era, accessibility, and performance. The columns may be one or any combination of performance indicators. The performance indicators may be obtained via Google analytics, a proprietary analytics script, or from any other source. The flow view may also present and/or highlight to a user the superlative target URL for each performance indicator or a subset thereof (e.g. the fastest and/or slowest load speed, the greatest and/or smallest carbon cost of page load, the greatest and/or smallest energy cost of page load, the greatest and/or smallest weight of page, the highest and/or lowest score of accessibility metric, the greatest and/or smallest daily weight). Alternatively, for quantitative performance indicators, the table 555 may indicate values that exceed one or more thresholds; e.g. the value can be considered good, ok, or poor. For example, such values may be indicated by colouring text green (indicated by underline in the figure), amber (indicated by italics in the figure), or red. In addition, the flow UI may indicate any CSS class usage indicating a web page from the flow utilizes a version of the CSS class other than the most common version utilized in the flow, or other than the most recent version utilized in the flow.

FIG. 5C illustrates a page search interface of the application, which provides an interface to search the data store 300 for an entry identified by or representing a URL input to field 544 as a search string. Checkboxes 545 enable a user to search the exact URL or to filter the URL to remove regular expressions and shortcodes and/or replace these with wildcards. For example, text analysis rules may be used to remove regular expressions by searching for key characters or strings and removing from the search string those key characters or strings and/or characters appearing after and/or before. A most recently executed search is indicated at 546, for which a representation of the entry found for the search is displayed at 547. Buttons 530 enable a user to toggle between a list view and a thumbnail view of search results. Field 544 enables a user to search URLs whereas field 510 enables a user to search text within the code artefacts constructed, interpreted, and/or rendered from code from the target URL. For example, the render tree may be searched. In addition, the text within the page (i.e. the rendered version) is searchable via field 544. Radio buttons 540 enable a user to constrain client side code (wherein client side code is shorthand for the render tree and the rendered page) content searches. Tabs 550 enable a user to switch between application interfaces (wherein the application serves as a front end for the data store 300 to access web page renderings and performance indicators to write to the data store, and to provide a user means to access and edit the contents of the data store 300, i.e. the entries for the URLs processed by the application). FIG. 5D illustrates a page search interface of the application as in FIG. 5C but in a state following a search for which no results were returned.

Figure 5E:
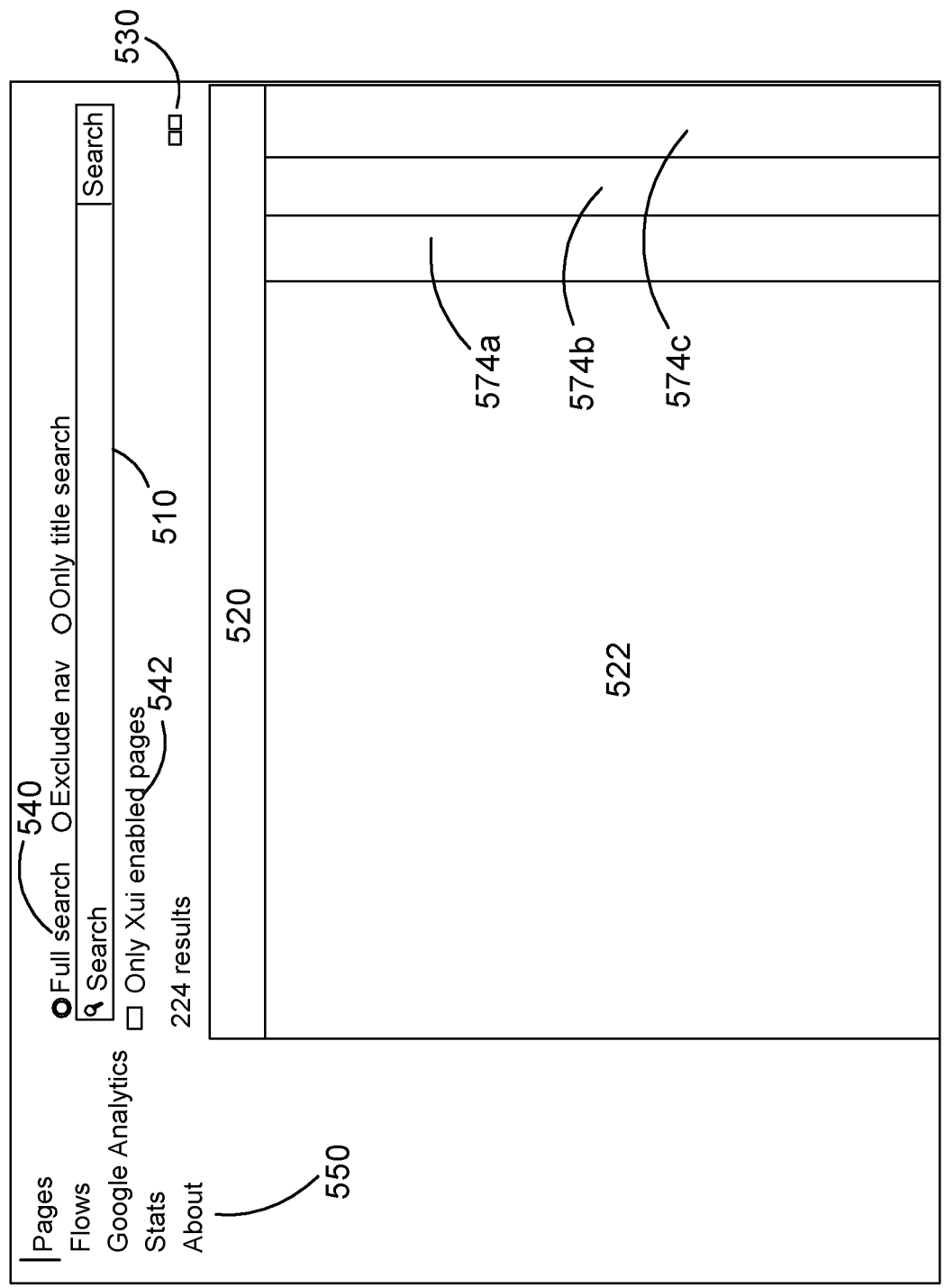
FIG. 5E illustrates a list view of a pages interface of the application of an embodiment.
Figure 5F:
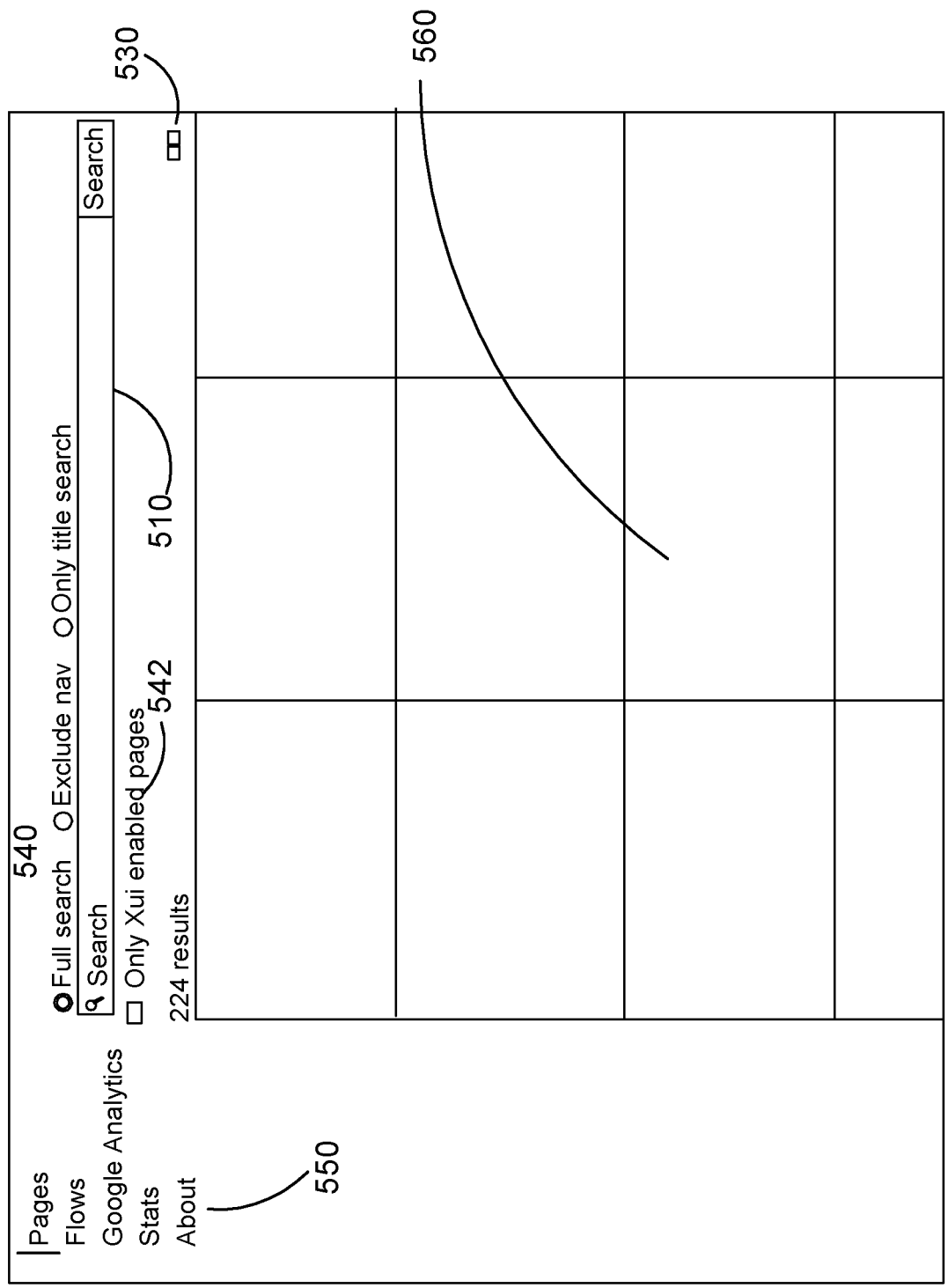
FIG. 5F illustrates a thumbnails view of a pages interface of the application of an embodiment.

FIG. 5E illustrates a list view of a pages interface of the application. The pages interface includes a search field 510 enabling a user of the application to search for a text string appearing in the title of target URLs processed by the application and for which entries exist in the data store 300, or to full text search the entries. Radio buttons 540 enable constraints to be applied to the search. In the Figures the radio buttons are "Full search", "exclude nav", and "only title search". The "exclude nav" button enables a search to preclude searching of code relating to navigation on the page. Otherwise, for example, a search for a word which also happens to be a name of a key function of the webapp would bring up every page. A check box 542 (accompanied by text "only XUI enabled pages" in the Figures) enables a user to constrain the search to target URLs which embed a proprietary user interface style and/or proprietary code libraries. Search results are displayed in a list 522, with a header row 520 indicating the information displayed in the list 522 and corresponding data columns 524a-c. For example, header row 520 indicates that the list 522 is a list of titles (wherein a detailed view of the data stored in the data store 300 as an entry corresponding to each listed title is accessible via the respective listed title). Header row 520 indicates that column 524a indicates "views" for the URL indicated by the title of the respective row. For example, views may be a performance indicator for the URL obtained via a tool such as Google analytics caused to execute by the application. Header row 520 indicates that column 524b indicates "time" for the URL indicated by the title of the respective row, which is a load time for the web page (either full load or time to first meaningful paint). For example, load time may be a performance indicator for the URL obtained via a tool such as Google analytics caused to execute by the application. Header row 520 indicates that column 524c indicates "Xui #" for the client-side representation of code acquired from the URL indicated by the title of the respective row. For example, Xui # is a performance indicator for the client-side representation of code acquired from the URL indicating a version of a proprietary library, such as a proprietary user interface style. It is noted that all three performance indicators are not necessarily displayed for each target URL, depending on availability. A button 530 enables a user to toggle between a list view for search results as illustrated in FIG. 5F, and a thumbnails view as illustrated in FIG. 5E. A list of tabs 550 enables a user to switch between interfaces.

FIG. 5F illustrates a thumbnails view of a pages interface of the application. Page corresponds to a particular URL in this context. The thumbnails view is the same as the list view illustrated in FIG. 5D with the exception of the list 520-524c being replaced by a grid 560 of scaled down screenshots (e.g. most recent client-side representations stored in data store 300 in the entry for the respective target URL) which, equivalent to the titles in the list view, act as a link to a detail view of the data stored in the data store 300 for the respective target URL.

Figure 5G:
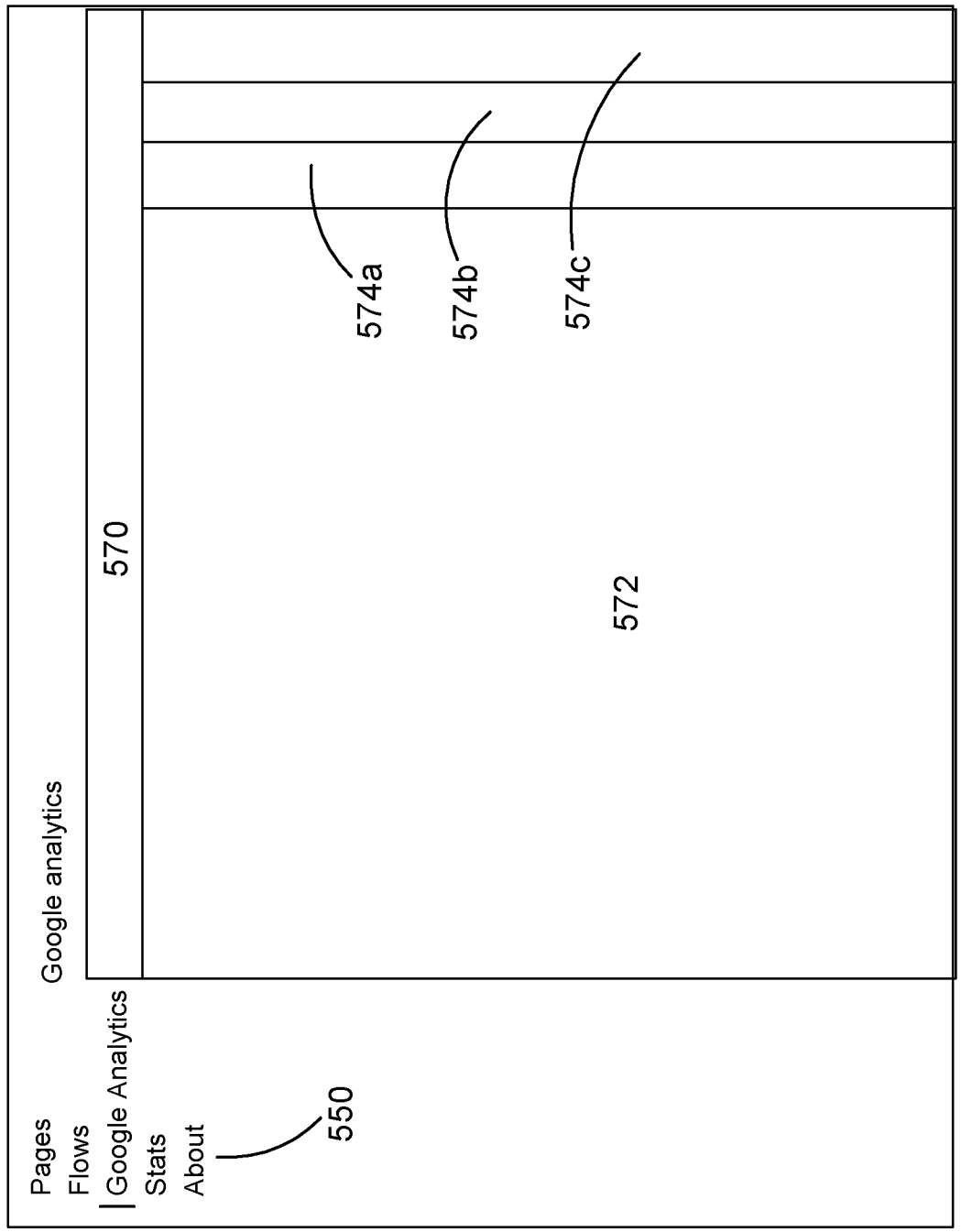
FIG. 5G illustrates a list view of an analytics interface of the application of an embodiment.

FIG. 5G illustrates a list view of a google analytics interface of the application. The list of tabs 550 enables a user to switch between interfaces. A header row 570 indicates the information displayed in each column of the list 572-574. The header row 570 indicates that column 572 indicates a URL of each listed page, column 574a indicates a first performance indicator from Google analytics (for example, daily views), 572b indicates a second performance indicator from Google analytics (for example, error, which can be true or false depending on whether a load error has occurred while loading the page during a predefined period), 572c indicates either a third performance indicator from Google analytics (for example, load time or load speed, or page weight, or daily weight) or indicates a unique ID for the target URL within the data store 300 (that is, a key for the entry corresponding to the page in the data store 300). The selection of columns is configurable by a user and the number of columns is also configurable. Clicking the appropriate indicator in the header row changes the sorting of the listed pages so that they are sorted according to a value of the clicked indicator. Clicking (i.e. mouse click or otherwise selecting) the same indicator in the header row as is presently being used to sort the pages may reverse the order. The selection of target URLs may be all target URLs of the website or webapp or may be a subset selected at the pages interface.

Figure 6:
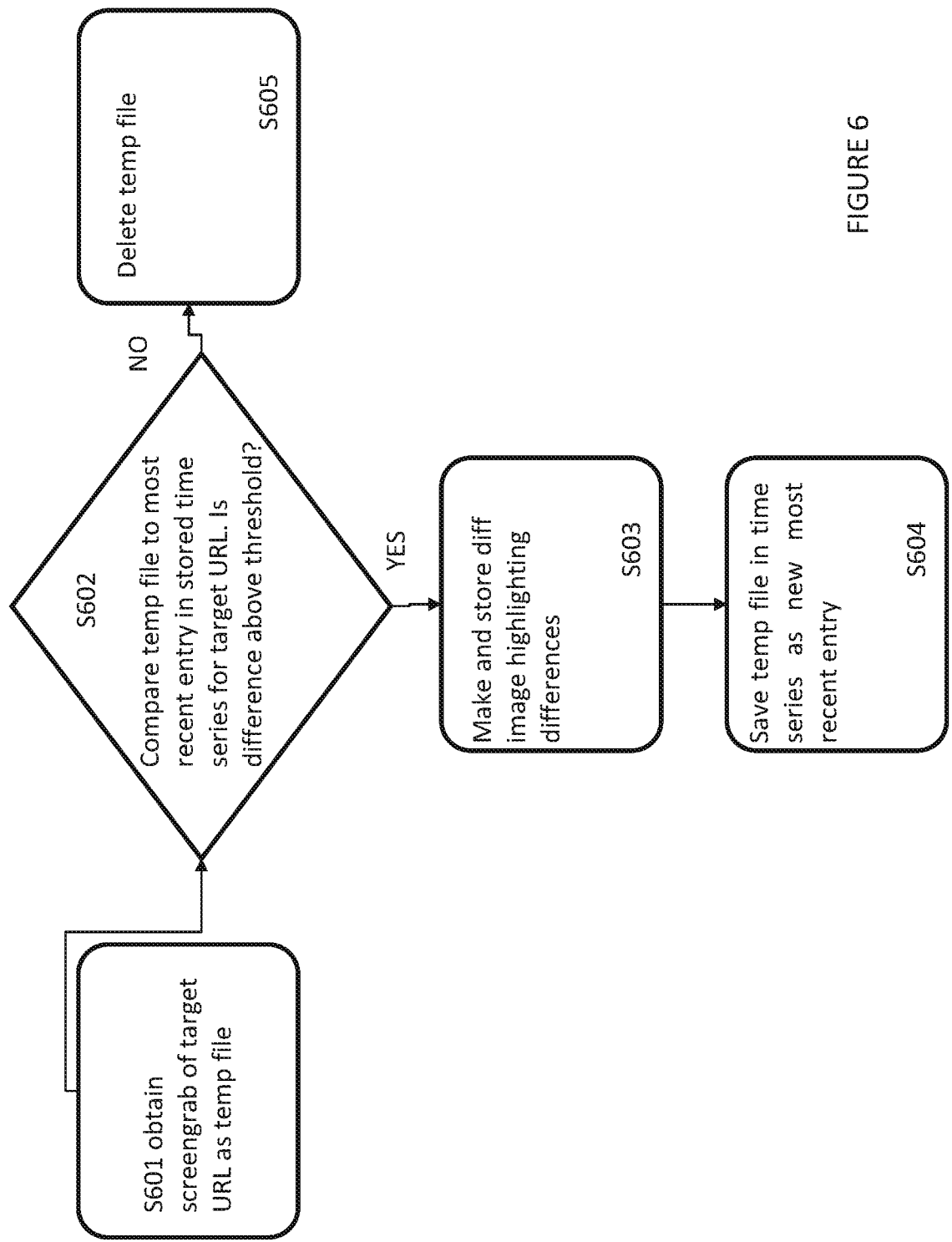
FIG. 6 illustrates a process performed by the application in obtaining and comparing the client-side representations in an embodiment.
Figure 7B:
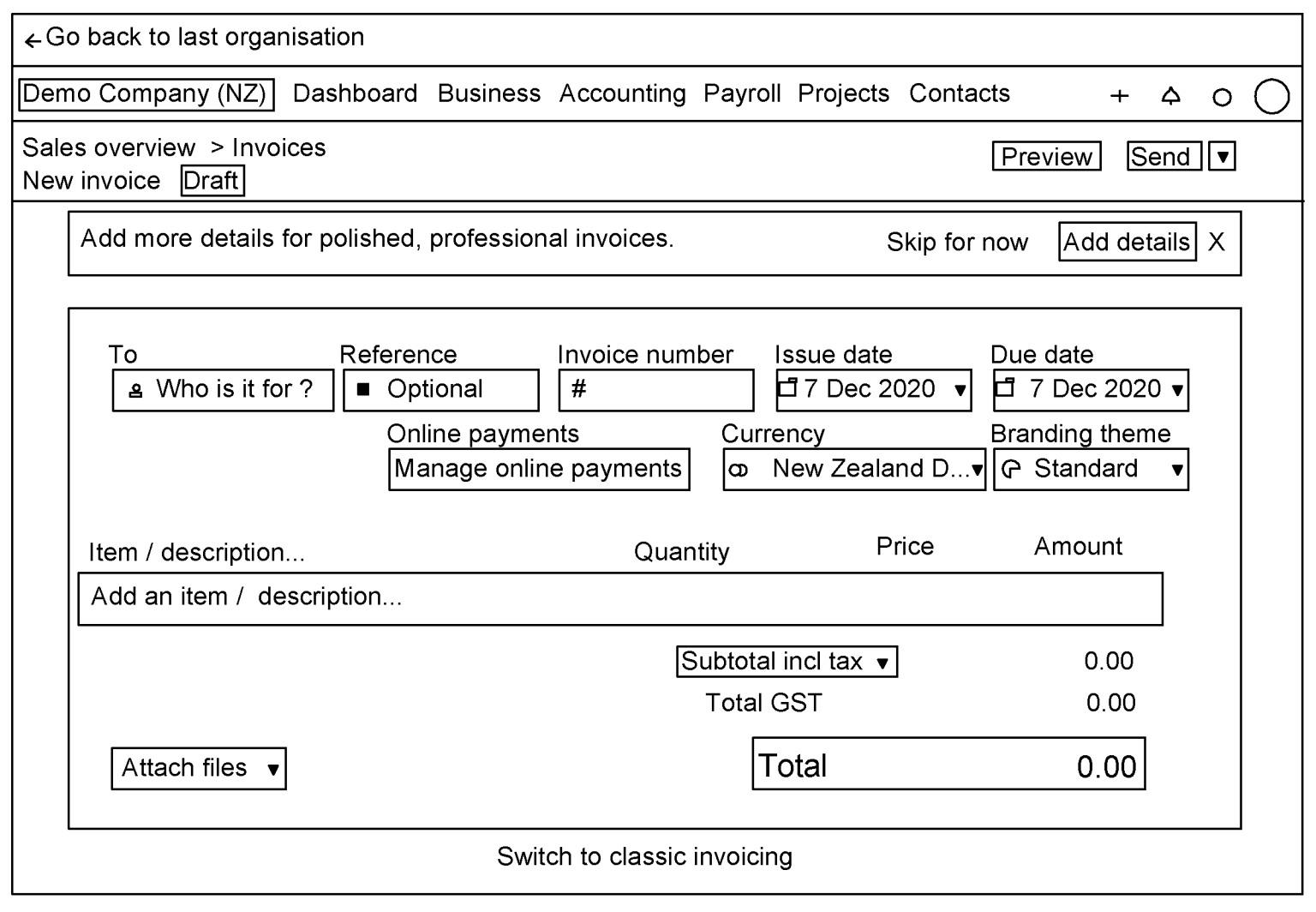

FIG. 6 illustrates a process performed by the application in obtaining and comparing the client-side representations. That is, FIG. 6 illustrates an example of steps S103 to S105 of FIG. 1. At S601 a screengrab of the web page generated by rendering the interpretation of code acquired from the target URL is obtained as a temp file (i.e. stored for processing but not committed to data store 300). An example is illustrated at FIG. 7A. At S602 the temp file is compared to a reference version, such as a most recent member in a stored time series of client-side representations of the target URL. An example of a reference version is shown in FIG. 7B, which is exemplary of a second client-side representation. It may be that any change is sufficient to obtain a positive result at S602 and proceed to S603 and S604. It may be that the threshold specifies a minimum amount of change between the two images (e.g. number of changed pixels as a proportion of image pixels). If the threshold is satisfied, the flow proceeds to S603 to S604. If not, the flow proceeds to S605 and the temp file is deleted. At S603 a diff image is generated and stored (for example, as metadata or otherwise in association with the respective time series of the target URL). An exemplary diff image for the images of FIGS. 7A and 7B is shown in FIG. 7C. At S604 the temp file is committed to the entry for the target URL as a new reference version.

Figure 8:
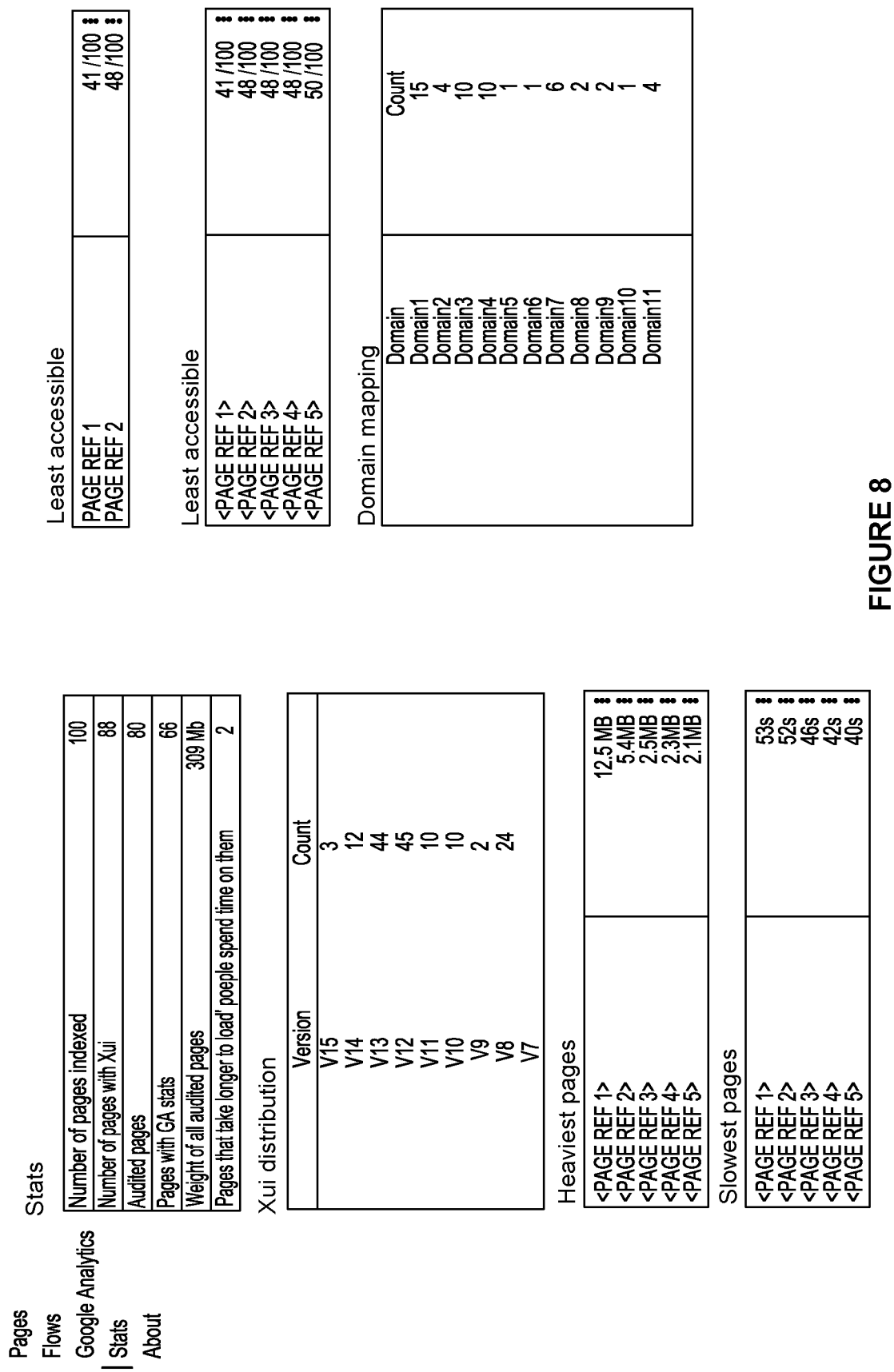
FIG. 8 illustrates a statistics interface of an embodiment.

FIG. 8 illustrates a statistics interface of the application. The application may also gather statistics for the website as a whole by comparing the time series and performance indicators for the individual web pages (each corresponding to a target URL) within the website (or web app). Statistics include number of target URLs indexed for the site, number of pages using a proprietary user interface style for the site (i.e. specified CSS classes), number of target URLs in the site for which the application has initiated an entry in the data store 300, number of target URLs for which analytics from a third party analytics provider are available, total weight of all web pages for which the application has initiated time series in the data store 300, number of pages for which the load time exceeds the amount of time users spend on the page, statistics regarding usage of different versions of the proprietary user interface style, a listing of the n heaviest pages (wherein n may be, for example, 1, 2, 5, or 10), a listing of the n slowest pages (wherein n may be, for example, 1, 2, 5, or 10), a listing of the n pages with the lowest score of the accessibility metric (wherein n may be, for example, 1, 2, 5, or 10), and a number of target URLs mapping to each domain, which may include domains within the website or webapp and/or separate and distinct domains. Embodiments may implement any one or any combination of the above statistics in a statistics page or tab such as that illustrated in FIG. 8. It is noted that page (i.e. web page) is used to refer to a rendering of the code acquired from the target URL. So each target URL has a corresponding webpage, and to that extent anything attributed to a target URL is by implication attributed to a corresponding webpage (or page), and vice-versa.

FIG. 9A illustrates an interface 900 for adding a new target URL to the application, and FIG. 9B illustrates an interface 910 for editing an entry in the data store 300 for a particular target URL. Field 902 allows a user to input a URL for processing by the application (i.e. creation of an entry in the data store 300, repetitive obtaining of client-side representations) as a target URL. Field 904 enables selection of a specific version of the URL, in implementations in which a single target URL may host different versions depending on one or more operating variables. In this example, the different versions are different geographical versions and the operating variable may be a geographic location of a user or a geographic location stored as part of a user profile, for example. The selection of one or more country editions creates an entry for each edition as a separate web page (albeit logically linked). The application is configured to obtain from the web server the code stored for the specific version selected at 904 in obtaining the client-side representations. Field 906 is an optional field allowing an equivalence link to be added by a user, specifying another target URL that is part of the same site and is the same as the (specific version of the) web page at the target URL. Field 908 enables a user to input a location at which analytics information for the page at the target URL, obtained from a third party tool such as Google analytics, is accessible. A text field 909 enables a user to add notes. Edit interface 910 enables a user, at any time following creation of an entry via interface 900, to edit any of the details entered at the addition of the target URL or during subsequent editing. A further field 912 enables a user to modify an automatically-generated title for the entry in the data store 300. The title is automatically-generated by the application based on information at the target URL, but may be modified, for example to a title more meaningful to the user. A button 914 enables a user to commit changes to the entry in the data store 300.

Figure 10A:
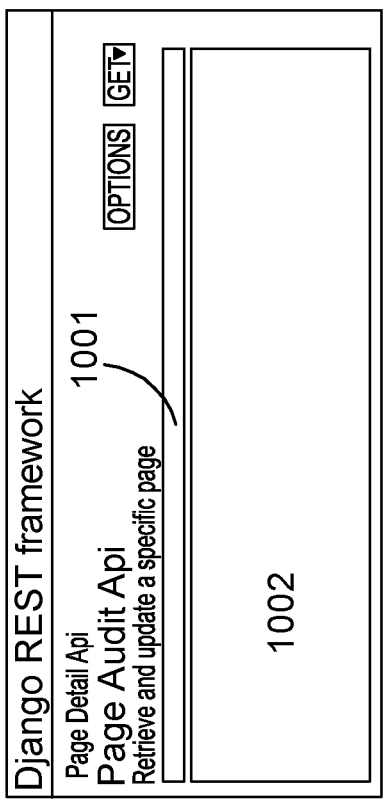
FIGS. 10A to 10D illustrate APIs of embodiments.
Figure 10B:
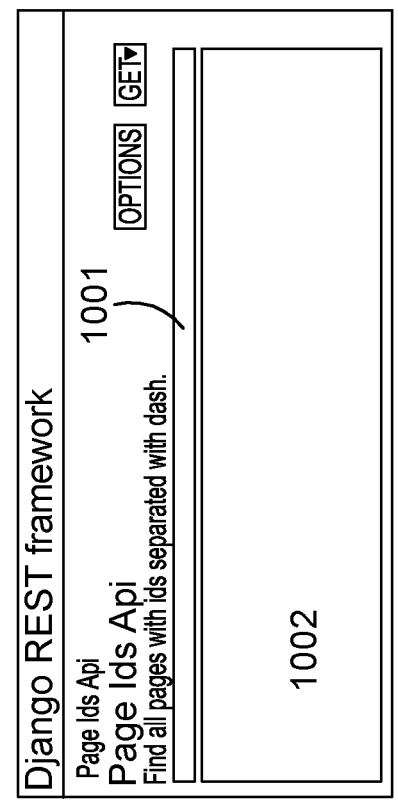
Figure 10C:
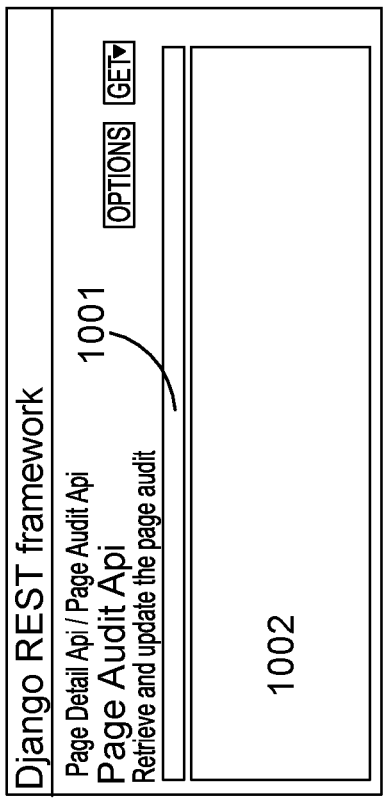
Figure 10D:
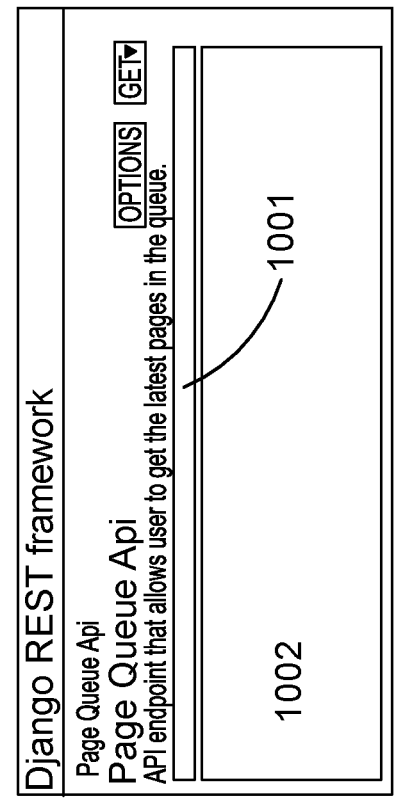

FIGS. 10A to 10D illustrate APIs (application programming interfaces) that enable the application to run on a computing device and to remotely access the data store 300 storing the entries for the target URLs (i.e. time series of client side representations and performance indicators) and/ or one or more web servers 200 hosting one or more web pages. Page audit API is illustrated in FIG. 10A. The API comprises a GET locator 1001 and API code 1002. Page audit API retrieves and updates entries for an entire website or webapp. Page detail API is illustrated in FIG. 10B. The API comprises a GET locator 1001 and API code 1002. Page detail API retrieves and updates an entry for a particular target URL. Page queue API is illustrated in FIG. 10C. The API comprises a GET locator 1001 and API code 1002. Page queue API is an API endpoint that allows users to get the latest pages in a queue of target URLs. Page Ids API is illustrated in FIG. 10D. The API comprises a GET locator 1001 and API code 1002. Page Ids API finds all pages with page ids separated by dashes.

Figure 11:
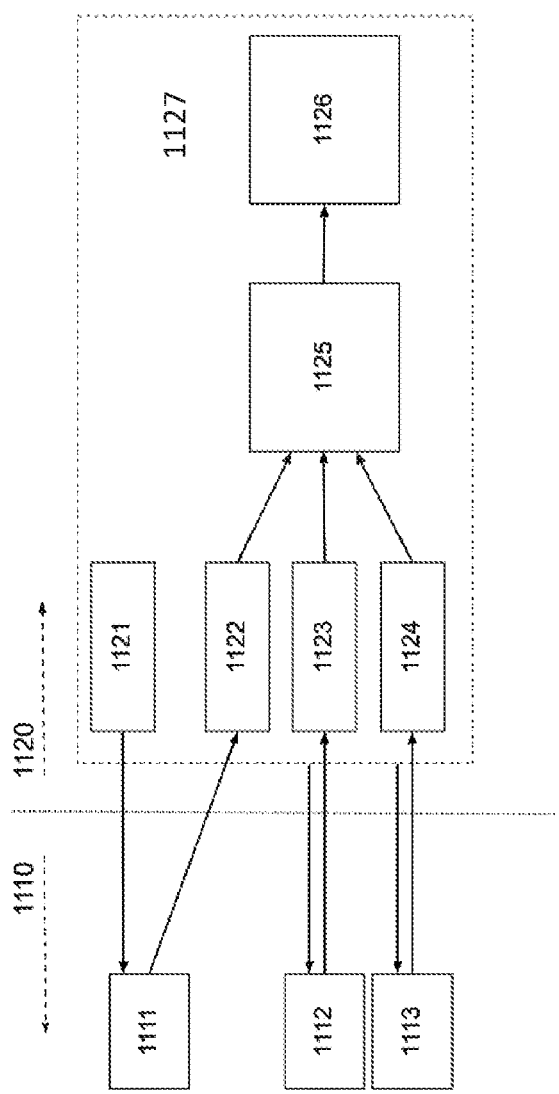
FIG. 11 illustrates the functionality of the one or more web browser applications of an embodiment.

FIG. 11 illustrates the functionality of the one or more web browser applications. 1110 indicates the server-side. 1120 indicates the client-side with the dashed line indicating the browser engine or web-browser application (e.g. all functionality on the client-side 1120 is provided by the web browser application). The client is an application that runs on a computing device and is connected to the internet. Alternatively, the computing device running the application may itself be considered to be the client. The client transmits requests to the server side 1110. The server is a machine connected to the internet and which receives requests from clients and responds to them. In the present application the content returned from the server to the client is referred to as acquired code, to distinguish from the finalized (i.e. displayed) version of said code which is referred to as a web page. It is noted that in some models the content served to the client by the server is referred to as a web page. A server has an IP address which is mapped from a URL by a DNS service. A URL is a uniform resource locator which identifies a particular web resource. HTTP is a protocol that web servers and clients use to communicate with one another over the internet, the protocol being specified in a URL by the common prefix "http" or "https".

A target URL 1121 is input to the web browser application 1127. A request is transmitted to the server side 1110 and static HTML 1111 stored on the server is returned to the web browser application 1127 in response. The HTML 1122 at the client side 1120 is processed by the web browser application 1127. Said processing may include one or more from among: converting bytes to characters, identifying tokens, converting tokens to nodes, using nodes to build a document object model tree. The processing may include parsing the HTML to identify assets such as images, CSS file, Javascript files. For each asset, the request-reply process between the web browser application 1127 and the server side 1110 is repeated.

The web browser application 1127, for example, as a consequence of the processing of the client-side HTML, requests from the server side one or more assets from among: link tags, tokens identifying static assets, and API calls. One or more from among the static assets (for example, javascript, CSS, images, such as may be stored in a content delivery network (CDN)) 1112 at the server side 1110 are returned to the client side 1120 in response as returned static assets 1123. The returned static assets 1123 are received by the web browser application 1127 at the client side 1120. It is noted the javascript inline or in one or more script tags is interpreted by the web browser application 1127 and may alter the DOM or CSSOM directly. API requests may be made in javascript.

The web browser application 1127, for example, as a consequence of the processing of the client-side HTML, makes requests to one or more APIs at the server side 1110. One or more APIs 1113 (or portions thereof) at the server side 1110 are accessed and API request results 1124 are returned to the client side 1120 in response. The API request results 1124 are received by the web browser application 1127 at the client side 1120.

The acquired code, comprising one or more from among the returned HTML 1122, the returned static assets 1123, and the API request results 1124, is interpreted by the web browser application 1127 to generate a render tree 1125. The render tree 1125 may be generated using one or more from among a document object model and a CSS object model. The document object model is a convention for how to represent objects located in an HTML document. The objects can be manipulated by scripting languages such as javascript. The CSS in the acquired code is parsed by the web browser application 1127 to calculate CSS style, position, coordinates etc for each node in the DOM. The result of the parsing is the instructions required by the web browser application 1127 to render or paint the web page in a browser window. A web page 1126 (which may be a UI) for display in the window (i.e. visible window) of the web browser application 1127 is rendered by the web browser application 1127 and displayed. The rendering may include forming a layout (to create a box model), and painting/rasterizing (to create the final UI). Rendering is the process of determining the pixel values for display on a screen. In the present application, the rendering process is conceptually divided into interpretation (going from acquired code to render tree) and rendering (going from render tree to displayed web page (i.e. pixel values)).

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A computing apparatus being a single desktop or laptop computer comprising a processor and a memory, and configured to:
   execute an application, the application being configured, when executed, to perform a process for one or more web browser applications, each web browser application being configured, when executed, to receive an input URL and to acquire code from a web server location identified by the input URL, and to generate a client-side representation of the acquired code, wherein the one or more web browser applications comprises:
   a first web browser application configured to identify as a desktop or laptop web browser when acquiring the code from the web server location identified by the input URL; and
   a second web browser application running on the computing apparatus within a virtual environment emulating an operating system of a mobile device, the second web browser application being configured to identify as a mobile device web browser application when acquiring the code from the web server location identified by the input URL, and to emulate a mobile device web browser when generating the client-side representation;

the process being performed for the each web browser application and comprising performing, on a repetitive basis:
　causing the web browser application to execute with a target URL as the input URL to acquire code from the web server location identified by the target URL;
　obtaining, as a first client-side representation, a snapshot image of a webpage as displayed by the web browser application by interpreting and rendering the acquired code;
　obtaining a second client-side representation, wherein the second client-side representation is obtained from a time series of snapshot images of the webpage displayed by the web browser application by interpreting and rendering code acquired from the target URL at respective previous repetitions of the process, and the second client-side representation is a most recent member of the time series;
　calculating, by an image differencing algorithm, a difference metric indicative of a difference between the first client-side representation and the second client-side representation; and
　comparing the difference metric with a threshold, and if the difference metric exceeds the threshold:
　　causing an analytics script to run on the target URL to obtain a set of one or more performance indicators, wherein the set of one or more performance indicators includes an accessibility metric, being a metric representing accessibility for at least one of hearing-impaired users, cognitive-impaired users, neurological-impaired users, physical-impaired users, speech-impaired users, or visually-impaired users of a web page; and
　　causing the first client-side representation to be added to the time series as a new most recent member in association with the one or more performance indicators and a timestamp.

2. The computing apparatus according to claim 1, wherein the first client-side representation is stored in association with a difference image based on pixel-wise-subtracting the first client-side representation from the second client-side representation, or vice-versa.

3. The computing apparatus according to claim 1, wherein the first client-side representation and the second client-side representation are multi-modal representations comprising a text representation of a respective acquired code as interpreted by a respective web browser application and a snapshot image of the webpage as displayed by the respective web browser application by interpreting and rendering the acquired code; and
　the difference metric comprises a contribution from each of the image differencing algorithm comparing the snapshot images and a text differencing algorithm comparing text representations.

4. The computing apparatus according to claim 1, wherein the application is configured to repeat the process periodically according to a predefined period, and to provide an alert to a registered alert recipient in an event of the difference metric exceeding the threshold, the alert indicating at least the target URL.

5. The computing apparatus according to claim 1, wherein the process further comprises, following the obtaining and preceding the calculating the difference metric, filtering, the filtering comprising:
　filtering out at least one of unique IDs, shortcodes, or numeric IDs, and replacing them with wildcards, prior to comparing two client-side representations.

6. The computing apparatus according to claim 1, being further configured to:
　in obtaining the first client-side representation, respond to instances of javascript in the code from the target URL by triggering an in-page activation, the first client-side representation comprising an image or text portion representing the in-page activation.

7. The computing apparatus according to claim 1, being further configured to:
　identify any further URLs accessible as links in the acquired code from the target URL, and for each further URL, to execute the process with the further URL as the target URL.

8. The computing apparatus according to claim 1, wherein the application is configured to receive a series of URLs associated in a flow, to execute the application with each of the series of URLs as the target URL, to associate client-side representations of the URLs to one another with an indication that the URLs belong to a common flow.

9. The computing apparatus according to claim 1, wherein the computing apparatus comprises memory hardware and processor hardware, the memory hardware being configured to store processing instructions which, when executed, implement the application, and the processor hardware being configured to execute the processing instructions in association with the memory hardware.

10. A computer-implemented method, comprising, at a single desktop or laptop computer comprising a processor and a memory:
　executing an application, the application being configured, when executed, to perform a process for one or more web browser applications, each web browser application being configured, when executed, to receive an input URL and to acquire code from a web server location identified by the input URL, and to generate a client-side representation of the acquired code, wherein the one or more web browser applications comprises:
　a first web browser application configured to identify as a desktop or laptop web browser when acquiring the code from the web server location identified by the input URL; and
　a second web browser application running on the single desktop or laptop computer within a virtual environment emulating an operating system of a mobile device, the second web browser application being configured to identify as a mobile device web browser application when acquiring the code from the web server location identified by the input URL, and to emulate a mobile device web browser when generating the client-side representation;
　the process being performed for the each web browser application and comprising performing, on a repetitive basis:
　　causing the web browser application to execute with a target URL as the input URL to acquire code from the web server location identified by the target URL;
　　obtaining, as a first client-side representation, a snapshot image of a webpage as displayed by the web browser application by interpreting and rendering the acquired code;
　　obtaining a second client-side representation, wherein the second client-side representation is obtained from a time series of snapshot images of the webpage displayed by the web browser application by interpreting and rendering code acquired from the target URL at respective previous repetitions of the process, and the second client-side representation is a most recent member of the time series;

calculating, by an image differencing algorithm, a difference metric indicative of a difference between the first client-side representation and the second client-side representation; and comparing the difference metric with a threshold, and if the difference metric exceeds the threshold:
  causing an analytics script to run on the target URL to obtain a set of one or more performance indicators, wherein the set of one or more performance indicators includes an accessibility metric, being a metric representing accessibility for at least one of hearing-impaired users, cognitive-impaired users, neurological-impaired users, physical-impaired users, speech-impaired users, or visually-impaired users of a web page; and
  causing the first client-side representation to be added to the time series as a new most recent member in association with the one or more performance indicators and a timestamp.

11. A non-transitory computer-readable storage medium storing a computer program configured, when executed by a computing apparatus being a single desktop or laptop computer comprising a processor and a memory, to perform a process for one or more web browser applications, each web browser application being configured, when executed, to receive an input URL and to acquire code from a web server location identified by the input URL, and to generate a client-side representation of the acquired code, wherein the one or more web browser applications comprises:
  a first web browser application configured to identify as a desktop or laptop web browser when acquiring the code from the web server location identified by the input URL; and
  a second web browser application running on the computing apparatus within a virtual environment emulating an operating system of a mobile device, the second web browser application being configured to identify as a mobile device web browser application when acquiring the code from the web server location identified by the input URL, and to emulate a mobile device web browser when generating the client-side representation;

the process being performed for the each web browser application and comprising performing, on a repetitive basis:
  causing the web browser application to execute with a target URL as the input URL to acquire code from the web server location identified by the target URL;
  obtaining, as a first client-side representation, a snapshot image of a webpage as displayed by the web browser application by interpreting and rendering the acquired code;
  obtaining a second client-side representation, wherein the second client-side representation is obtained from a time series of snapshot images of the webpage displayed by the web browser application by interpreting and rendering code acquired from the target URL at respective previous repetitions of the process, and the second client-side representation is a most recent member of the time series;
  calculating, by an image differencing algorithm, a difference metric indicative of a difference between the first client-side representation and the second client-side representation; and
  comparing the difference metric with a threshold, and if the difference metric exceeds the threshold:
    causing an analytics script to run on the target URL to obtain a set of one or more performance indicators, wherein the set of one or more performance indicators includes an accessibility metric, being a metric representing accessibility for at least one of hearing-impaired users, cognitive-impaired users, neurological-impaired users, physical-impaired users, speech-impaired users, or visually-impaired users of a web page; and
    causing the first client-side representation to be added to the time series as a new most recent member in association with the one or more performance indicators and a timestamp.

* * * * *